(12) United States Patent
Watts

(10) Patent No.: US 10,160,114 B2
(45) Date of Patent: Dec. 25, 2018

(54) TRAJECTORY PLANNING WITH DROPPABLE OBJECTS

(71) Applicant: X Development LLC, Mountain View, CA (US)

(72) Inventor: Kevin William Watts, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/788,391

(22) Filed: Oct. 19, 2017

(65) Prior Publication Data

US 2018/0056512 A1 Mar. 1, 2018

Related U.S. Application Data

(63) Continuation of application No. 15/150,756, filed on May 10, 2016, now Pat. No. 9,821,458.

(51) Int. Cl.
*G01C 21/00* (2006.01)
*B25J 9/16* (2006.01)

(52) U.S. Cl.
CPC .......... *B25J 9/163* (2013.01); *B25J 9/1612* (2013.01); *B25J 9/1664* (2013.01); *G05B 2219/39266* (2013.01); *G05B 2219/39289* (2013.01)

(58) Field of Classification Search
CPC ........ B25J 9/163; B25J 9/1612; B25J 9/1664; G05B 2219/39266; G05B 2219/39289
See application file for complete search history.

(56) References Cited

U.S. PATENT DOCUMENTS

| | | | |
|---|---|---|---|
| 9,238,304 B1 | 1/2016 | Bradski et al. | |
| 9,630,316 B2 * | 4/2017 | Konolige | B25J 5/007 |
| 2013/0184860 A1 | 7/2013 | Ota et al. | |
| 2013/0184870 A1 | 7/2013 | Ota et al. | |
| 2013/0345873 A1 | 12/2013 | Blumberg et al. | |
| 2016/0016311 A1 * | 1/2016 | Konolige | B25J 5/007 |
| | | | 700/245 |

* cited by examiner

*Primary Examiner* — Ian Jen
(74) *Attorney, Agent, or Firm* — McDonnell Boehnen Hulbert & Berghoff LLP

(57) ABSTRACT

Example implementations may relate to methods and systems for determining a safe trajectory for movement of an object by a robotic system. According to these various implementations, the robotic system may determine at least first and second candidate trajectories for moving the object. For at least a first point along the first candidate trajectory, the robotic system may determine a predicted cost of dropping the object at the first point along the first candidate trajectory. And for at least a second point along the second candidate trajectory, the robotic system may determine a predicted cost of dropping the object at the second point along the second candidate trajectory. Then, based on these various determined predicted costs, the robotic system may select between the first and second candidates trajectories and may then move the object along the selected trajectory.

20 Claims, 15 Drawing Sheets

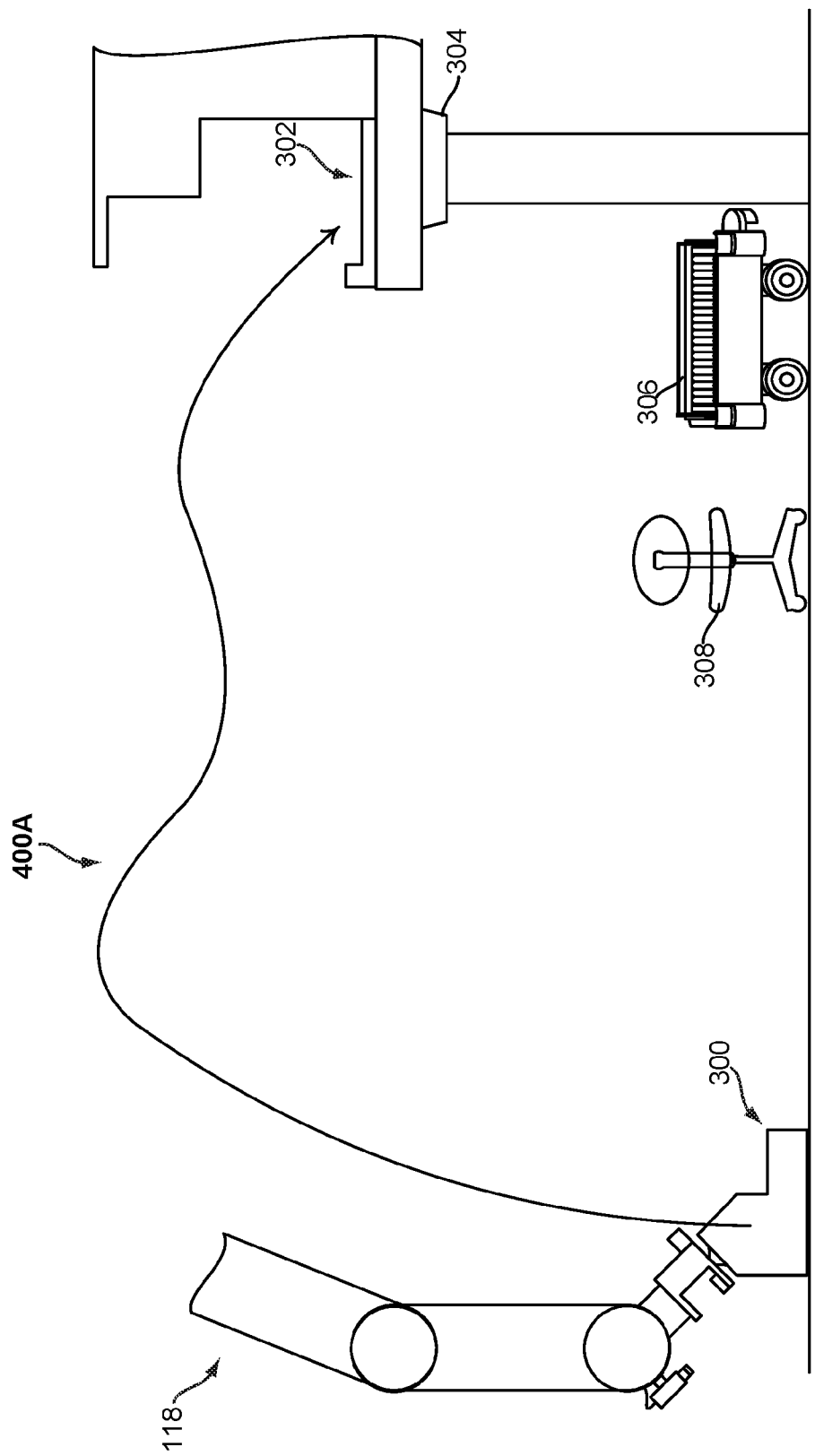

US 10,160,114 B2

TRAJECTORY PLANNING WITH DROPPABLE OBJECTS

CROSS-REFERENCE TO RELATED APPLICATION

The present application claims priority to U.S. patent application Ser. No. 15/150,756, filed on May 10, 2016 and entitled "Trajectory Planning with Droppable Objects," which is hereby incorporated by reference in its entirety.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of safely working in various environments becomes apparent. Therefore, a demand for such robotic systems has helped open up a field of innovation in safety techniques, sensing techniques, as well as component design and assembly.

SUMMARY

According to an example implementation, a robotic system may carry out a trajectory planning process for movement of an object. During this trajectory planning process and/or after one or more trajectories have already been planned, the robotic system may select a candidate trajectory to use for movement of the object and may do so at least based on various predicted costs that are related to consequences of dropping the object. In practice, these consequences may specifically relate to safety of the object itself and/or to safety of other entities (e.g., other objects and/or devices) in the environment, among other possibilities. Accordingly, the robotic system may determine various predicted costs for various candidate trajectories and may then select one of those candidate trajectories based on evaluation of those various determined predicted costs.

In one aspect, a method is provided. The method involves determining, by a robotic system, at least first and second candidate trajectories for moving an object in an environment from a first location to a second location. The method also involves, for at least a first point along the first candidate trajectory, the robotic system determining a predicted cost of dropping the object at the first point along the first candidate trajectory. The method additionally involves, for at least a second point along the second candidate trajectory, the robotic system determining a predicted cost of dropping the object at the second point along the second candidate trajectory. The method further involves, based at least on the determined predicted cost for the first point along the first candidate trajectory and on the determined predicted cost for the second point along the second candidate trajectory, the robotic system selecting between the first and second candidates trajectories. The method yet further involves the robotic system moving the object from the first location to the second location along the selected trajectory.

In another aspect, a robotic system is provided. The robotic system includes one or more processors, a non-transitory computer readable medium, and program instructions stored on the non-transitory computer readable medium and executable by the one or more processors to perform functions. In particular, the program instructions may be executable to determine at least first and second candidate trajectories for moving an object in an environment from a first location to a second location. Also, the program instructions may be executable to, for at least a first point along the first candidate trajectory, determine a predicted cost of dropping the object at the first point along the first candidate trajectory. Additionally, the program instructions may be executable to, for at least a second point along the second candidate trajectory, determine a predicted cost of dropping the object at the second point along the second candidate trajectory. Further, the program instructions may be executable to, based at least on the determined predicted cost for the first point along the first candidate trajectory and on the determined predicted cost for the second point along the second candidate trajectory, select between the first and second candidates trajectories. Yet further, the program instructions may be executable to move the object from the first location to the second location along the selected trajectory.

In yet another aspect, another method is provided. The method involves determining, by a robotic system, a candidate trajectory for moving an object in an environment from a first location to a second location. The method also involves, for at least a first point along the candidate trajectory, the robotic system determining a predicted cost of dropping the object at the first point. The method additionally involves, based at least on the determined predicted cost for the first point along the candidate trajectory, the robotic system making a determination of whether or not to move the object along the candidate trajectory. The method further involves, if the determination is to not move the object along the candidate trajectory, then, responsive to making the determination, the robotic system determining a different candidate trajectory for moving the object from the first location to the second location. The method yet further involves, if the determination is to move the object along the candidate trajectory, then, responsive to making the determination, the robotic system moving the object from the first location to the second location along the candidate trajectory.

In yet another aspect, another robotic system is provided. The robotic system includes one or more processors, a non-transitory computer readable medium, and program instructions stored on the non-transitory computer readable medium and executable by the one or more processors to perform functions. In particular, the program instructions may be executable to determine a candidate trajectory for moving an object in an environment from a first location to a second location. Also, the program instructions may be executable to for at least a first point along the candidate trajectory, determine a predicted cost of dropping the object at the first point. Additionally, the program instructions may be executable to, based at least on the determined predicted cost for the first point along the candidate trajectory, make a determination of whether or not to move the object along the candidate trajectory. Further, the program instructions may be executable to, if the determination is to not move the object along the candidate trajectory, then, responsive to making the determination, determine a different candidate trajectory for moving the object from the first location to the second location. Yet further, the program instructions may be executable to, if the determination is to move the object along the candidate trajectory, then, responsive to making the determination, move the object from the first location to the second location along the candidate trajectory.

In yet another aspect, a system is provided. The system may include means for determining at least first and second candidate trajectories for moving an object in an environment from a first location to a second location. The system may also include means for, for at least a first point along the first candidate trajectory, determining a predicted cost of dropping the object at the first point along the first candidate trajectory. The system may additionally include means for, for at least a second point along the second candidate trajectory, determining a predicted cost of dropping the object at the second point along the second candidate trajectory. The system may further include means for, based at least on the determined predicted cost for the first point along the first candidate trajectory and on the determined predicted cost for the second point along the second candidate trajectory, selecting between the first and second candidates trajectories. The system may yet further include means for moving the object from the first location to the second location along the selected trajectory.

In yet another aspect, another system is provided. The system may include means for determining a candidate trajectory for moving an object in an environment from a first location to a second location. The system may also include means for, for at least a first point along the candidate trajectory, determining a predicted cost of dropping the object at the first point. The system may additionally include means for, based at least on the determined predicted cost for the first point along the candidate trajectory, making a determination of whether or not to move the object along the candidate trajectory. The system may further include means for, if the determination is to not move the object along the candidate trajectory, then, responsive to making the determination, determining a different candidate trajectory for moving the object from the first location to the second location. The system may yet further include means for, if the determination is to move the object along the candidate trajectory, then, responsive to making the determination, moving the object from the first location to the second location along the candidate trajectory.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 4A to 4B illustrate candidate trajectories, according to an example implementation.

DETAILED DESCRIPTION

Figure 1A:
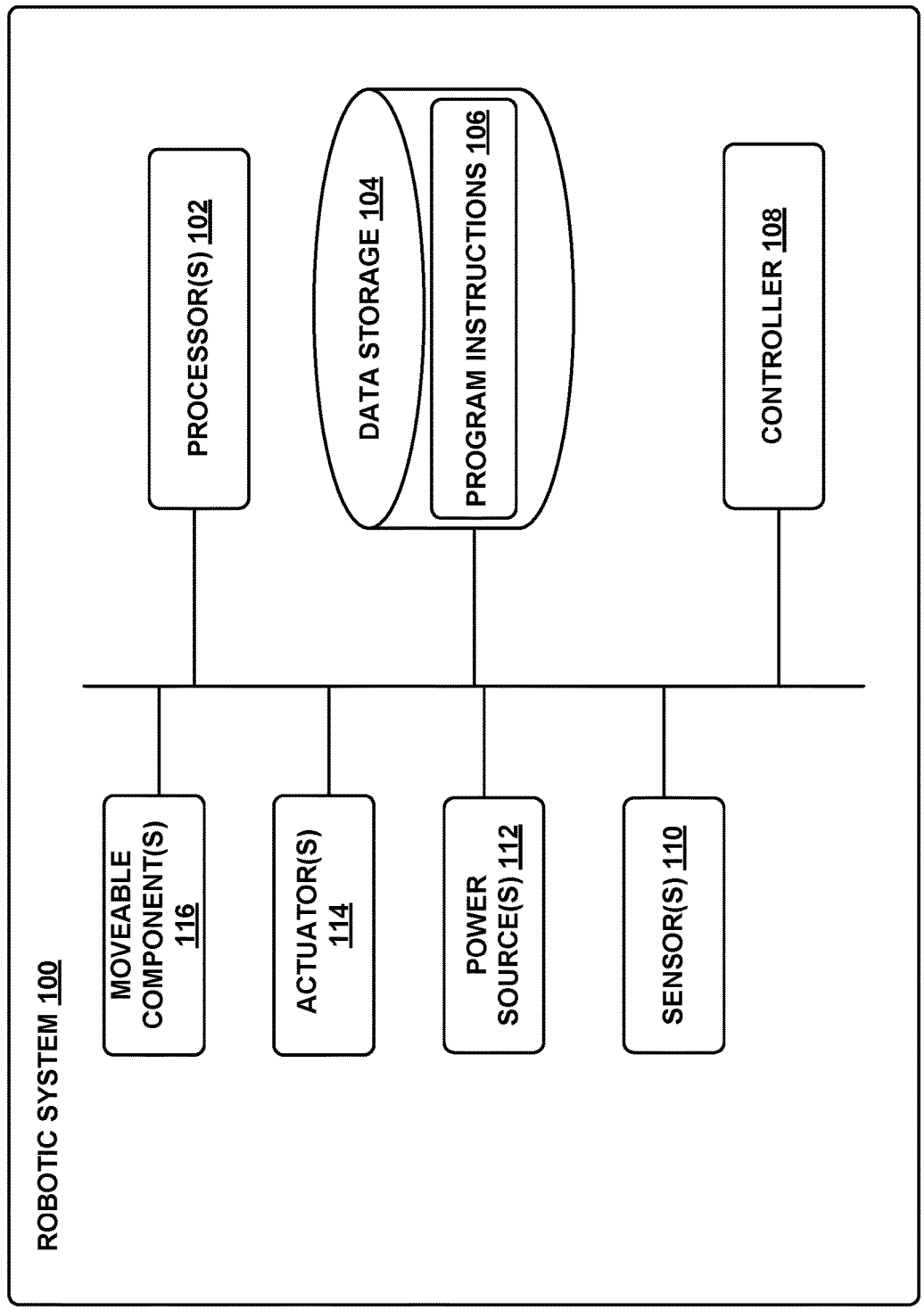
FIG. 1A illustrates components of a robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

As robotic systems become more prevalent in various industries and in various other aspects of modern life, safety considerations may play an increased role in design and development of robotic systems that operate in the vicinity of various entities in the environment. According to various implementations, described herein are methods and systems for determining a safe trajectory that a robotic system can use to move an object, which may ultimately allow the robotic system to operate in the vicinity of various entities (e.g., other objects and/or devices). According to these implementations, a robotic system may determine one or more candidate trajectories for moving the object and may evaluate each such candidate trajectory by considering consequences of dropping the object along that candidate trajectory and/or likelihood of dropping the object along that candidate trajectory. In practice, these consequences may specifically relate to safety of the object itself and/or to safety of entities in the environment, among other possibilities.

More specifically, the robotic system may determine predicted costs for each of various points along a candidate trajectory. For example, the robotic system may determine a predicted cost of dropping an object from a particular height at a given point along the candidate path, thereby essentially considering potential damage that could be caused to the dropped object. In another example, the robotic system may determine a predicted cost based on whether or not any entities are expected to be in the path of an object that is dropped at a given point, thereby essentially considering safety of those entities. Moreover, in addition to these various predicted costs, the robotic system may also determine probabilities of dropping the object at each of various points along the candidate trajectory.

Once the robotic system determines various predicted costs and/or various probabilities, the robotic system may then use these factors for selection of a trajectory to use for moving the object. For instance, the robotic system may attempt to select a candidate trajectory which provide for relatively low predicted costs of dropping the object and possibly also for a relatively low probability of dropping the object. Furthermore, such selection of a trajectory may involve comparing multiple candidate trajectories and then selecting one of those candidate trajectories or may involve evaluating a single candidate trajectory at a time.

II. Illustrative Systems

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a humanoid robot, a robotic arm, or a quadruped robot, among others. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116, among other operations.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. With this arrangement, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others. Further, when a robotic system 100 includes at least one end effector, such an end effector may be a tool and/or a gripper, among others.

Figure 1B:
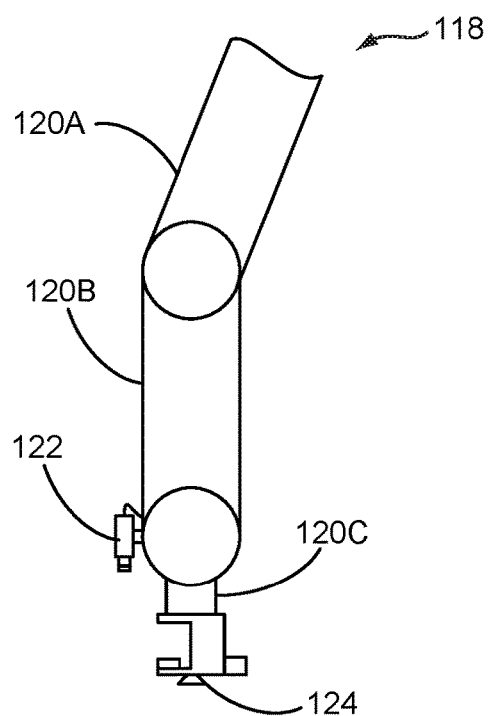
FIG. 1B illustrates a robotic arm, according to an example implementation.

A robotic system 100 may take on various forms. To illustrate, refer to FIG. 1B showing an example robotic arm 118. As shown, the robotic arm 118 includes movable component(s) 116, such as appendages 120A to 120C, which allow the robotic arm 118 to move around and interact with the environment. Additionally, the robotic arm 118 is shown to include a sensor 122 (e.g., an image capture device), such as one or more of the sensors discussed above. For example, the sensor 122 may be a LIDAR device, a time-of-flight camera, a structured light scanner, and/or a stereo camera, among other possibilities. Further, the robotic arm 118 includes a gripping component 124 ("gripper 124") for gripping objects in an environment of the robotic arm 118. For example, gripper 124 may be a suction type gripper; however, any type of gripper may be used.

Figure 2:
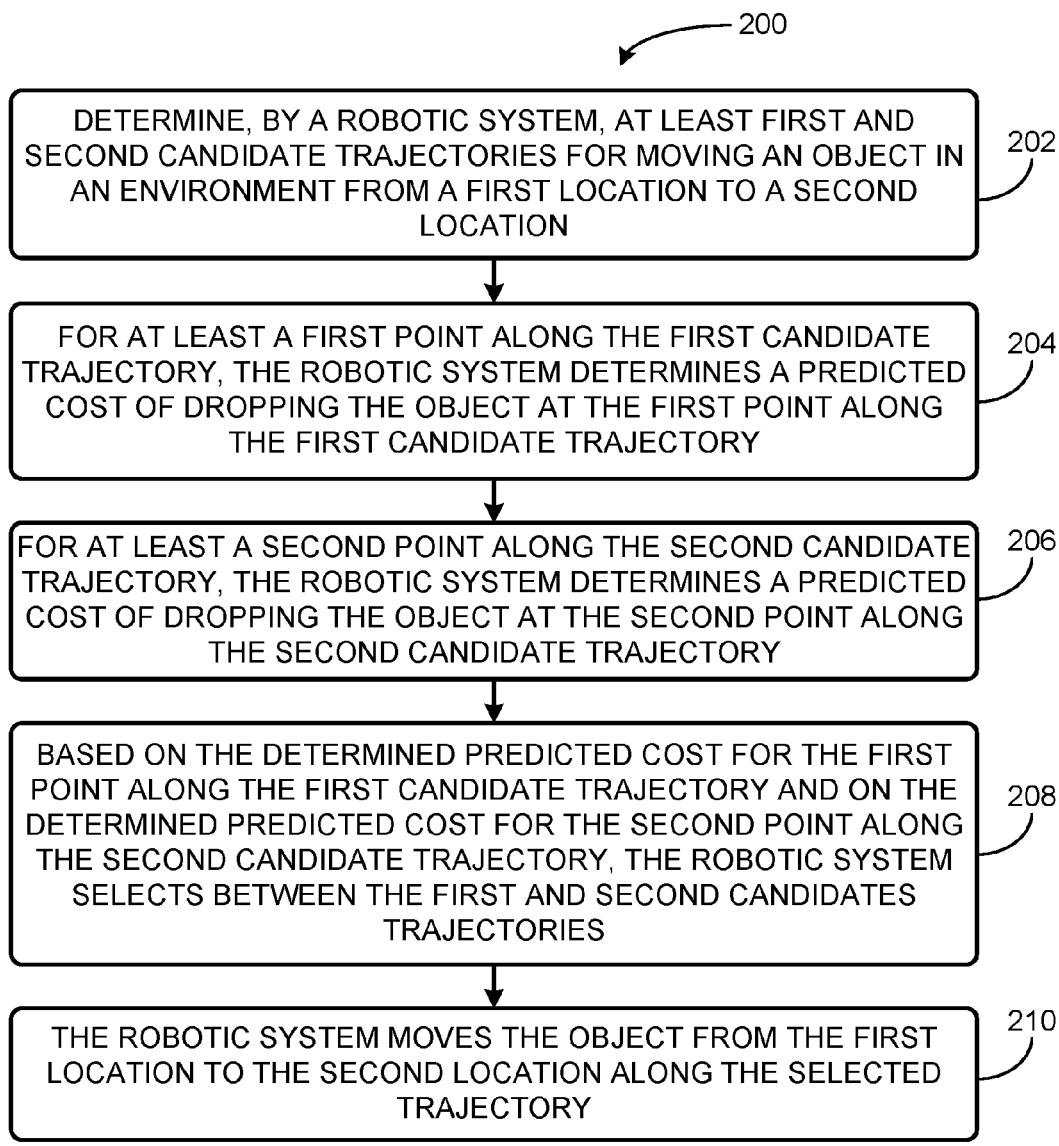
FIG. 2 is a flowchart for selecting a safe trajectory, according to an example implementation.

III. Selection Between Trajectories Based on Predicted Costs of a Dropped Object FIG. 2 is a flowchart illustrating a method 200, according to an example implementation. In particular, method 200 may be implemented to select a safe trajectory for movement of an object by a robotic system.

Method 200 shown in FIG. 2 (and other processes and methods disclosed herein) presents a method that can be implemented within an arrangement involving, for example, the robotic system 100 (or more particularly by one or more components or subsystems thereof, such as by a processor and a non-transitory computer-readable medium having instructions that are executable to cause the device to perform functions described herein). Additionally or alternatively, method 200 may be implemented within any other arrangements and systems.

Method 200 and other processes and methods disclosed herein may include one or more operations, functions, or actions as illustrated by one or more of blocks 202-210. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 200 and other processes and methods disclosed herein, each block in FIG. 2 may represent circuitry that is wired to perform the specific logical functions in the process.

At block 202, method 200 involves a robotic system determining at least first and second candidate trajectories for moving an object in an environment from a first location to a second location.

According to various implementations, a robotic system may seek to move an object from a first location to a second location. To do so, the robotic system may engage in a trajectory planning process to determine a trajectory for moving the object from the first location to the second location. In practice, the trajectory planning process may involve determining a path (e.g. a series of spatial locations) as well as one or more velocities for movement of the object along the path. Given these determinations, other attributes of the trajectory may be derived or otherwise planned, which may include (without limitation): timing for movement of the object along the path, one or more accelerations for movement of the object along the path, and/or kinematics for movement of the object along the path, among other possibilities.

Moreover, the trajectory planning process may occur before the robotic system begins to move the object and/or may occur while the robotic system is moving the object. And as part of this trajectory planning process, the robotic system may consider various factors, such as presence of obstacles (e.g., other entities) in the environment, a shape of the object, movement of the object over a shortest possible time period, and/or minimizing power consumption for instance. Generally, the robotic system may consider such factors so as to plan a trajectory that avoids collision with obstacles and/or may consider such factors for various other trajectory planning purposes. Consequently, the robotic system may use various techniques as part of the trajectory planning process, such as techniques that are currently known and/or those developed in the future.

With these arrangements, the robotic system may determine at least first and second candidate trajectories for moving the object from the first location to the second location. Generally, a candidate trajectory may be defined as a planned trajectory (or a trajectory that is in the process of being planning) that the robotic system evaluates in order to determine whether or not to use that trajectory for moving the object from the first location to the second location. In practice, evaluation of a trajectory may involve a comparison of two or more trajectories, such as a comparison of the first and second candidate trajectories at issue. Additionally or alternatively, as further described below, evaluation of a trajectory may involve evaluating a single candidate trajectory at a time. Nonetheless, these various trajectory planning and/or evaluation processes may take place in the context of various possible settings and situations that the robotic system may encounter.

Figure 3:
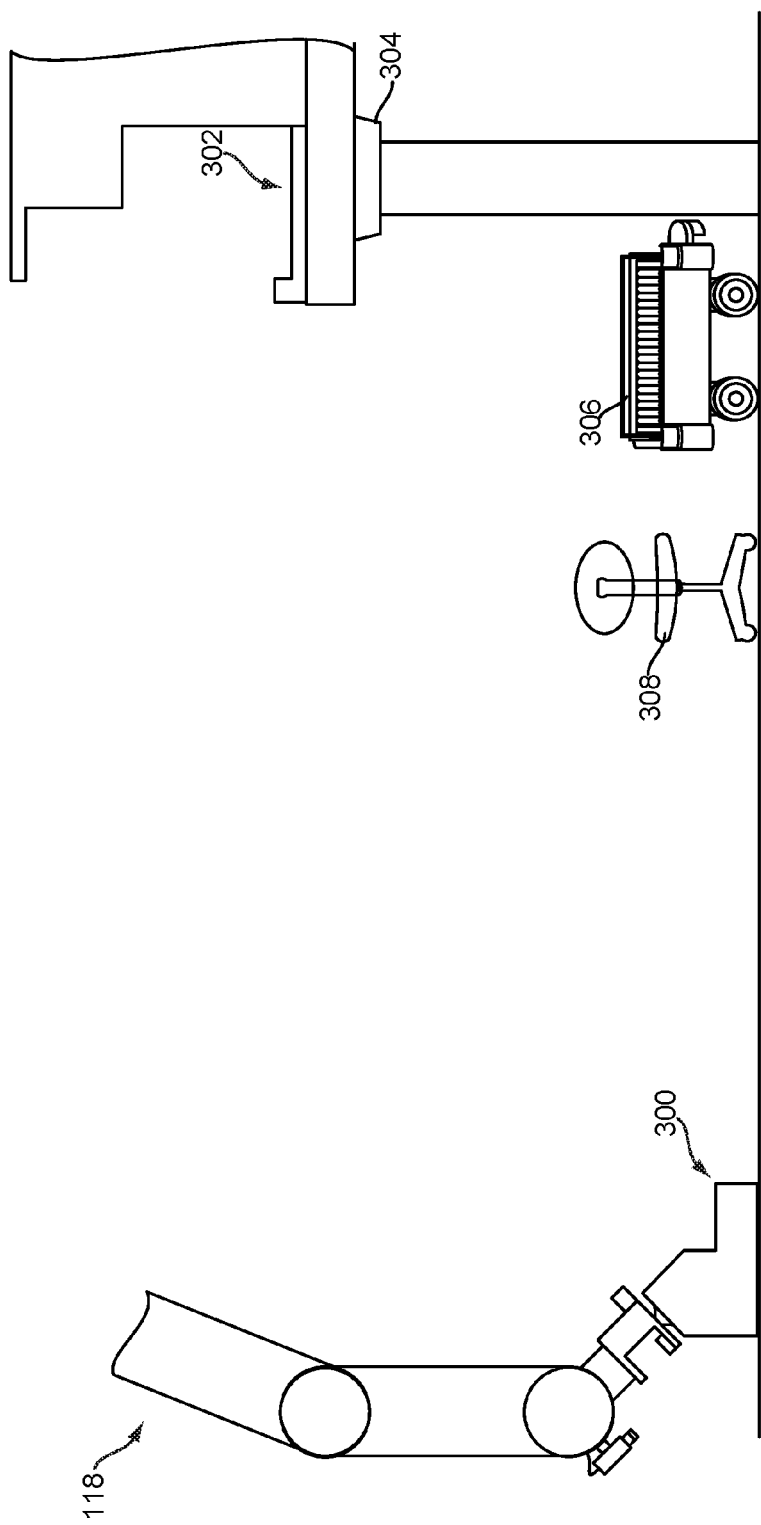
FIG. 3 illustrates the robotic arm preparing to move an object to a drop-off location, according to an example implementation.

By way of example, FIG. 3 illustrates the robotic arm 118 seeking to move object 300 to a drop-off location 302 on a platform 304. As shown, the robotic arm 118 is substantially in the vicinity of the platform 304, another robotic device 306, and a chair 308. Hence, the robotic arm 118 may consider nearby presence of the platform 304, the robotic device 306, and the chair 308 as part of the trajectory planning process. Further, while the object 300 is shown to as being of a certain shape and size, the example implementations disclosed herein may extend to objects having various shapes and sizes. Moreover, while FIG. 3 shows a two-dimensional (2D) representation of the object, the example implementations disclosed herein may also apply in the context of three-dimensional (3D) objects.

Figure 4B:
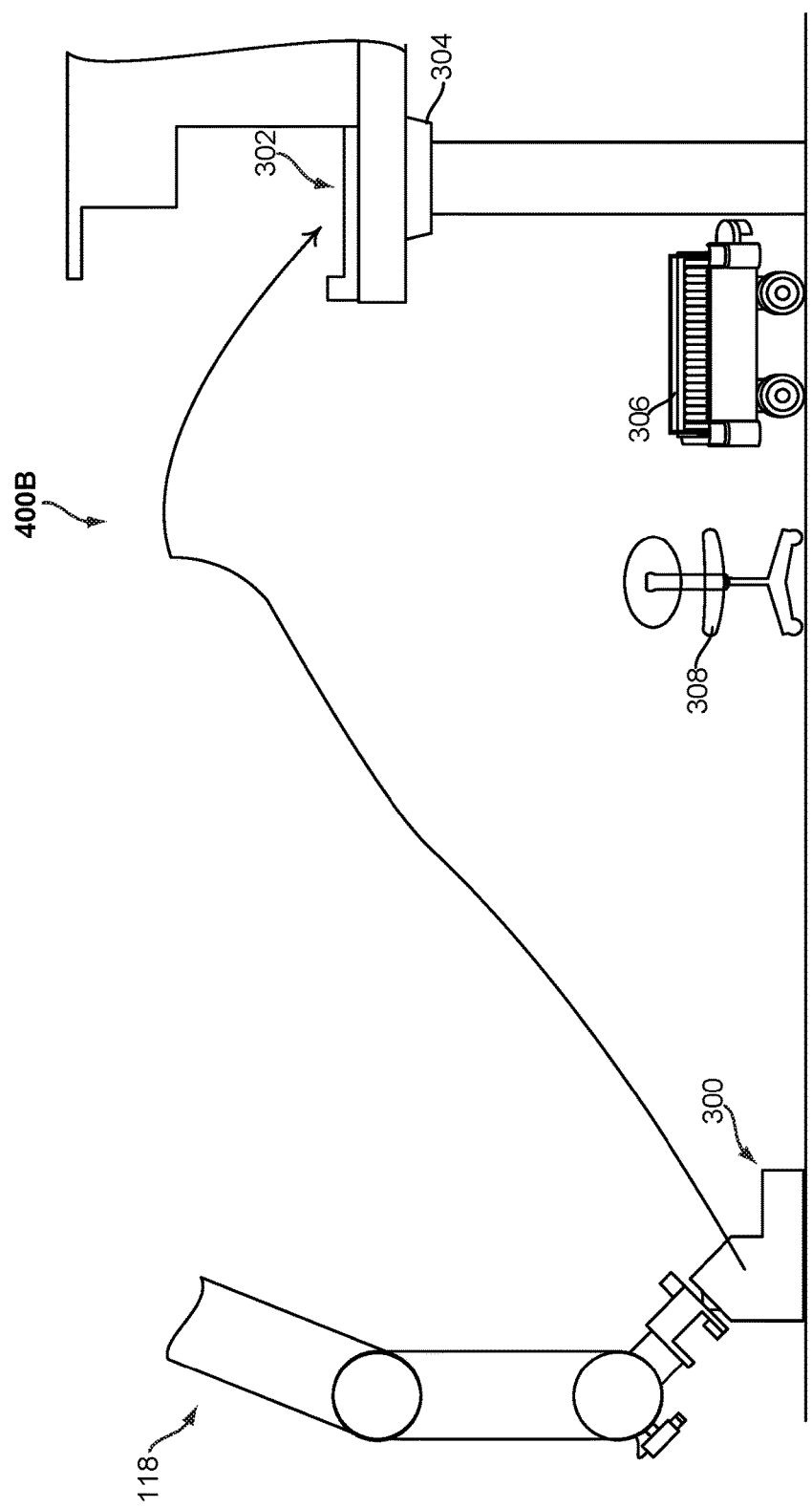

FIG. 4A to 4B next respectively illustrate candidate trajectories 400A and 400B for movement of the object 300 to the drop-off location 302. As shown, the first candidate trajectory 400A may involve planned movement of the object 300 along a different path than the path that is planned for movement of the object 300 along the second candidate trajectory 400B. Also, while not shown in FIGS. 4A to 4B, other attributes (e.g., timing, velocities, and/or accelerations) planned for movement of the object 300 along the first candidate trajectory 400A may be at least partially different than the corresponding attributes planned for movement of the object 300 along the second candidate trajectory 400B. Other illustrations are also possible.

Referring back to FIG. 2, at block 204, method 200 involves, for at least a first along the first candidate trajectory, the robotic system determining a predicted cost of dropping the object at the first point along the first candidate trajectory. Also, at block 206, method 200 involves, for at least a second point along the second candidate trajectory, the robotic system determining a predicted cost of dropping the object at the second point along the second candidate trajectory.

Disclosed herein are various implementations describing additional factors that the robotic system may consider as part of the trajectory planning process (e.g., in addition to any of the trajectory planning considerations described above) and/or as part of an evaluation of an already planned trajectory. These additional factors may include determining at least one predicted cost of dropping an object along a candidate trajectory. And as further described below, these additional factors may include determining at least one probability of dropping an object along a candidate trajectory.

In practice, the robotic system dropping an object may be defined as the act of the robotic system losing grip of the object and thus causing the object to freely move through space under the influence of gravity and perhaps also other factors. In some cases, dropping an object may be an unintentional dropping of the object, which may be a result of factors unplanned by the robotic system. In other cases, however, dropping an object may be an intentional dropping of the object, which may involve the robotic system planning a release of the object at some point along a candidate trajectory (e.g., in order to throw the object towards a certain location). As such, the various implementations described herein could technically apply in the context of unintentional object dropping and/or in the context of intentional object dropping.

In accordance with these various implementations, the robotic system may select one or more points to evaluate along each of various candidate trajectories. In doing so, for instance, the robotic system may use the same approach(s) when selecting points to evaluate along the first candidate trajectory as the approach(s) that the robotic system uses to select points to evaluate along the second candidate trajectory. Alternatively, the robotic system may use at least one different approach when selecting points to evaluate along the first candidate trajectory as compared with approach(s) that the robotic system uses to select points to evaluate along the second candidate trajectory.

In either scenario, the robotic system may use one or more of various approaches when selecting points to evaluate. Moreover, the robotic system's decision of which particular approaches to use may be based on the particular task that the robotic system carrying out, on the particular environment in which the robotic system is located, and/or on characteristics of the particular object that the robotic system seeks to move, among others. In some cases, the robotic system could additionally or alternatively receive input data (e.g., based on gestures that a user proves via a computing device in communication with the robotic system) specifying the approaches to use. Nonetheless, various example approaches are described below.

In one example approach, selecting points to evaluate may involve selecting each point along a candidate trajectory. In particular, as noted, a trajectory planning process may involve determining a path for the object to follow through space, which may specifically involve determining a series of spatial locations. In practice, these spatial locations may each be defined as a coordinate within a coordinate system corresponding to an environment in which the robotic system is located. As such, the robotic system selecting points to evaluate along a candidate trajectory may simply involve the robotic system choosing to evaluate each spatial location (e.g., each coordinate) through which the robotic system plans to move the object along the candidate trajectory.

In another example approach, selecting points to evaluate may involve selecting one or more points that are spatially distributed along the candidate trajectory at a particular spatial interval. More specifically, the robotic system may determine the particular spatial interval based on the considerations such as the particular task that the robotic system carrying out, the particular environment in which the robotic system is located, characteristics of the particular object that the robotic system seeks to move, and/or received input data specifying the particular spatial interval, among other possibilities. Additionally, the robotic system may determine an initial point with which to start selection of further points and could determine that initial point based on one or more of the above-mentioned considerations. In practice, that initial point may be a starting point of the candidate trajectory (i.e., the above-mentioned first location of the object) or could be any other feasible point along the candidate trajectory.

With this approach, the robotic system may set the initial point as a first selected point and may then determine another point along the candidate trajectory that is separated from the first selected point by the particular spatial interval (e.g., one meter) along the candidate trajectory. Once that other point is determined, the robotic system may set that other point as a second selected point and may then determine yet another point along the candidate trajectory that is separated from the second selected point by the particular spatial interval (e.g., one meter) along the candidate trajectory and so on. In this way, the robotic system may end up selecting a plurality of points with each selected point separated from the next selected point along the candidate trajectory by the particular spatial interval.

Moreover, this approach could apply for selecting points along the entirety of the candidate trajectory or along at least one segment of the candidate trajectory. And if this approach is applied for separately selecting points along two or more segment of the candidate trajectory, the particular spatial interval used for such selections could be the same or could be different for each segment. For instance, when making selections along a first segment of the candidate trajectory, the robotic system may select one or more points that are spatially distributed along the first segment at a first particular spatial interval. In contrast, when making selections along a second segment of the candidate trajectory, the robotic system may select one or more points that are spatially distributed along the second segment at a second particular spatial interval, which may be different from the first particular spatial interval. Other considerations are also possible with respect to this approach.

In yet another example approach, selecting points to evaluate may involve determining one or more inflection points along the candidate trajectory. In particular, an inflection point may define a point of transition between a convex segment of the candidate trajectory and a concave segment of the candidate trajectory. In this way, an inflection point may essentially be a point along the candidate trajectory at which a change in the direction of curvature occurs. Generally, such a change in direction of curvature may be of interest for purposes of point evaluation due such a change possibly coinciding with a change in probability of dropping the object or for other possible reasons. As such, the robotic system may determine one or more inflection points along the candidate trajectory and may then select one or more of those determined inflection points as points to evaluate.

In yet another example approach, selecting points to evaluate may involve determining one or more "nearby" points along the candidate trajectory that are each substantially close to at least one entity (e.g., to another object) in the environment, which may be of interest for purposes of point evaluation due to safety consideration for the at least one entity. In particular, the robotic system may determine that a particular point along the candidate trajectory is a "nearby" point based on that particular point being within a threshold distance away from an entity. That threshold distance may be based on the particular task that the robotic system carrying out, the particular environment in which the robotic system is located, characteristics of the particular object that the robotic system seeks to move, the type of entity at issue (e.g., first object vs. second object) and/or received input data specifying the threshold distance, among other possibilities. Nonetheless, such a determination could be carried out in various ways.

For instance, the robotic system may use sensor data to determine a spatial coordinate corresponding to the particular point as well as at least one spatial coordinate corresponding to the entity. Then, the robotic system may determine a particular spatial distance between those determine spatial coordinates and may determine whether the particular spatial distance is less than the threshold distance. And if that particular spatial distance is less than the threshold distance, then the robotic system may responsively determine that the particular point at issue is a "nearby" point and may thus select that particular point as a point to evaluate. With this approach, the robotic system could thus determine one or more such "nearby" points along the candidate trajectory and could then select one or more of those determined "nearby" points as points to evaluate. Various other example approaches are also possible.

Figure 5A:
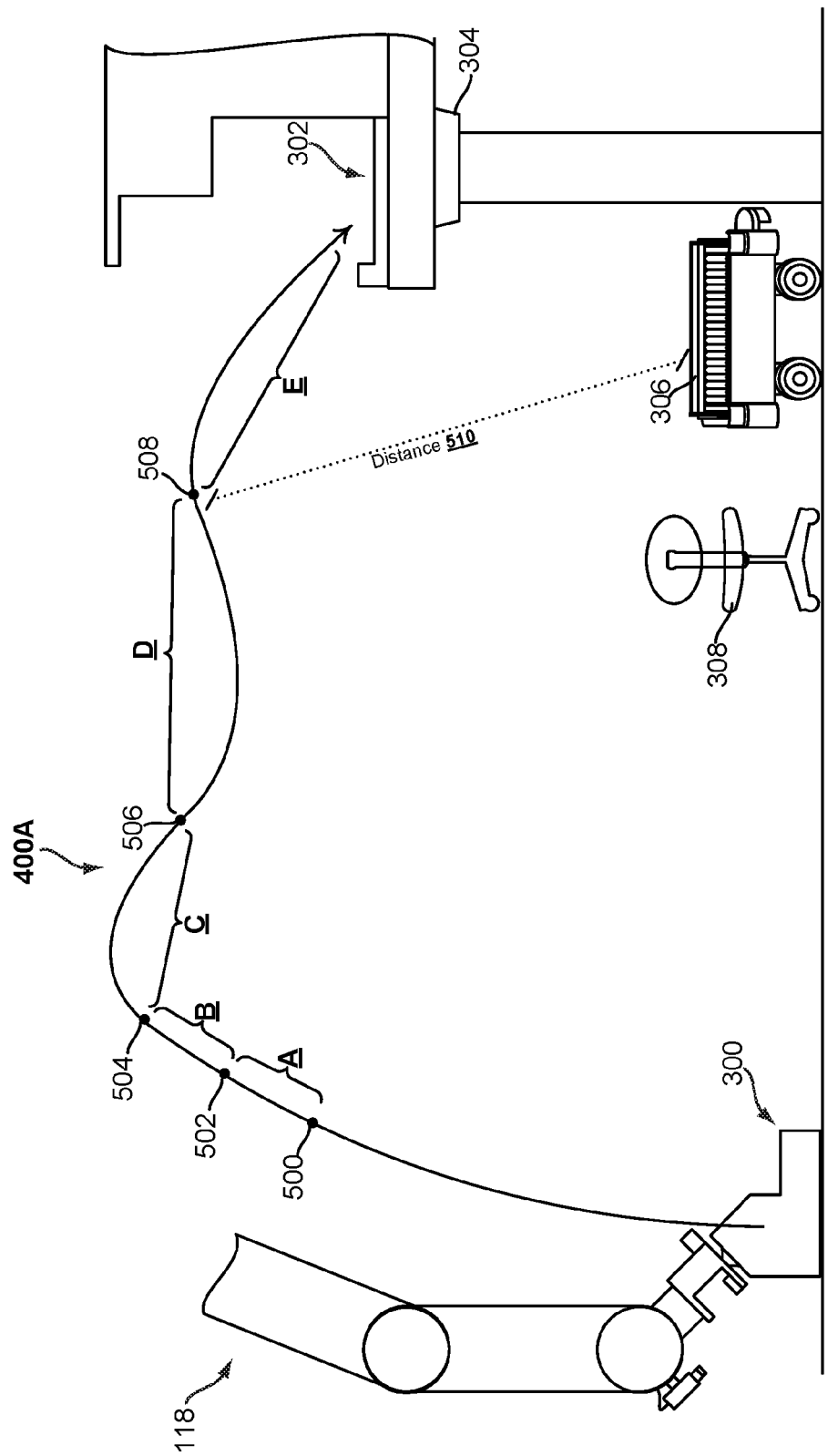
FIGS. 5A to 5B illustrate selection of points on the candidate trajectories, according to an example implementation.
Figure 5B:
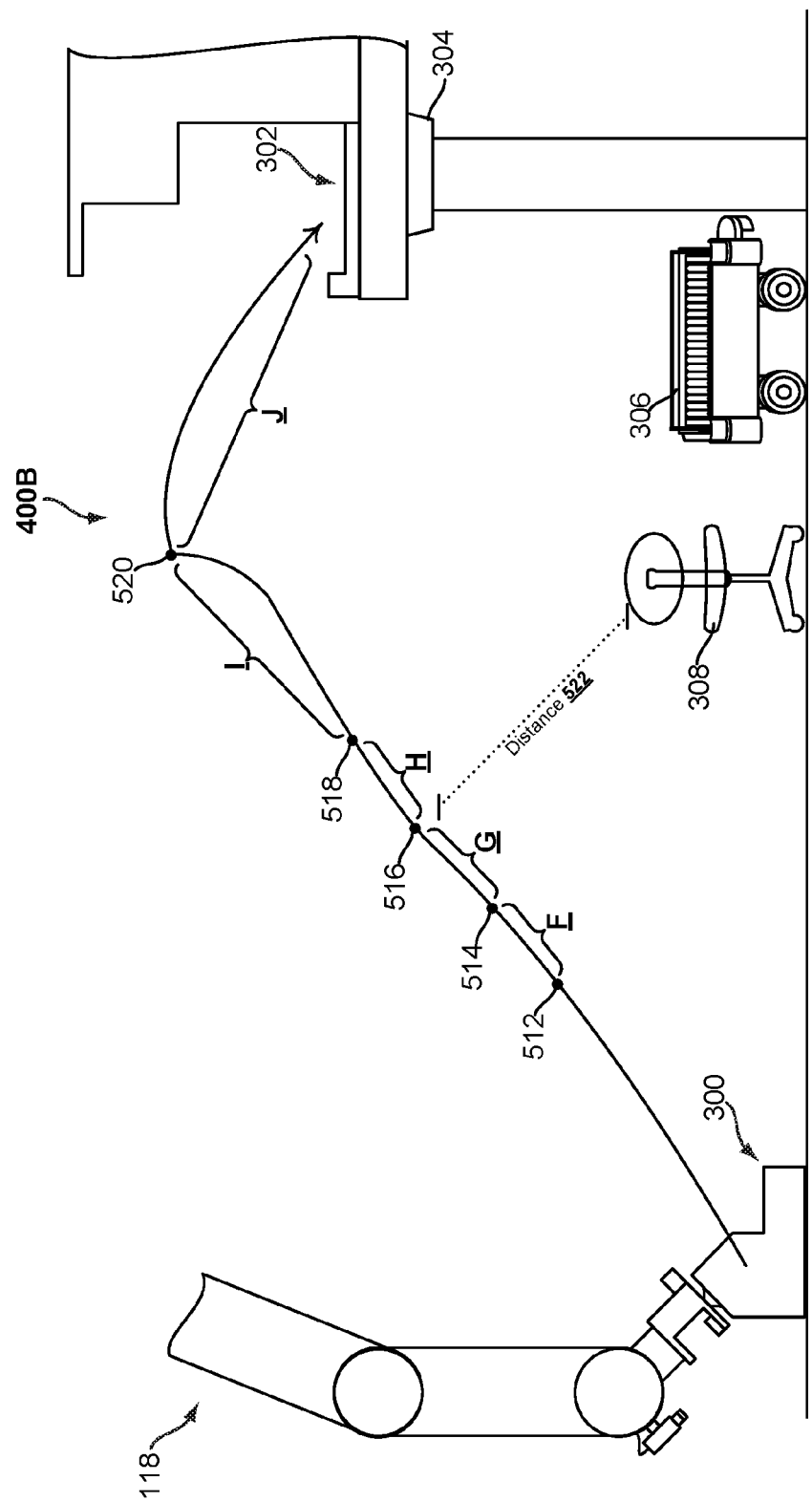

FIGS. 5A to 5B next respectively illustrate points that have been selected for evaluation. More specifically, FIG. 5A illustrates that points 500 to 508 along the first candidate trajectory 400A have been selected. Whereas, FIG. 5B illustrates that points 512 to 520 along the second candidate trajectory 400B have been selected.

Regarding FIG. 5A, points 500 to 508 may have been selected for various reasons. By way of example, points 500, 502, and 504 may have been selected based on the approach of selecting points that are spatially distributed. In particular, FIG. 5A illustrates a segment A of the trajectory 400A that is between points 500 and 502 and is the length of a particular spatial interval. Also, FIG. 5A illustrates a segment B of the trajectory 400A that is between points 502 and 504 and is also the length of that same particular spatial interval. In another example, points 506 and 508 may have been selected due to each being an inflection point. In particular, point 506 is shown as a point of transition between a concave segment C of the candidate trajectory 400A and a convex segment D of the candidate trajectory 400A. Also, point 508 is shown as a point of transition between a convex segment D of the candidate trajectory 400A and a concave segment E of the candidate trajectory 400A. And in yet another example, point 508 may have also been selected due to being a "nearby" point. In particular, point 508 is shown at a particular distance 510 away from the robotic device 306, which may be lesser than a threshold distance. Other examples are also possible.

Regarding FIG. 5B, points 512 to 520 may have been selected for various reasons. By way of example, points 512, 514, 516, and 518 may have been selected based on the approach of selecting points that are spatially distributed. In particular, FIG. 5B illustrates a segment F of the trajectory 400B that is between points 512 and 514 and is the length of a particular spatial interval (e.g., same as the particular spatial interval discussed in the context of FIG. 5A). Also, FIG. 5B illustrates a segment G of the trajectory 400B that is between points 514 and 516 and is also the length of that same particular spatial interval. Further, FIG. 5B illustrates a segment H of the trajectory 400B that is between points 516 and 518 and is also the length of that same particular spatial interval. In another example, point 516 may have also been selected due to being a "nearby" point. In particular, point 516 is shown at a particular distance 522 away from the chair 308, which may be lesser than a threshold distance. In yet another example, point 520 may have been selected due to being an inflection point. In particular, point 520 is shown as a point of transition between a convex segment I of the candidate trajectory 400B and a concave segment J of the candidate trajectory 400B. Other examples and illustrations are also possible.

Once one or more points have been selected along a candidate trajectory, the robotic system may determine one or more predicted costs of dropping the object at one or more of those selected points. In particular, a predicted cost of dropping the object may be defined as a numerical value representative of expected consequences of dropping the object. In practice, these possible consequences may relate to safety of (e.g., damage to) the object itself and/or safety of one or more entities (e.g., another object). Moreover, the predicted cost could be presented in any feasible form, such as by a number on a certain scale of numbers, among other possibilities. For example, a particular predicted cost could be presented as a value of four on a scale of one to ten, with one being the lowest possible cost (e.g., representative of lowest possible consequences to dropping the object) and with ten being the highest possible cost (e.g., representative of highest possible consequences to dropping the object). Also, in some cases, a particular predicted cost may represent an infeasible cost indicating that a candidate trajectory is completely infeasible (e.g., should not be used under any circumstances) and that infeasible cost may be indicated by a particular value, such as "−1" for instance. Other examples are possible as well.

When determining predicted cost(s) for each of one or more selected points along a candidate trajectory, the robotic system may determine the same predicted cost(s) at each given point or may determine at least one different predicted cost for at least one of those points. For instance, the robotic system could determine certain predicted cost(s) for a first given point along the candidate trajectory, could determine the same predicted cost(s) for a second given point along the candidate trajectory, and could continue to do so for each of the plurality of selected points along the candidate trajectory.

Whereas, in another instance, the robotic system could determine certain predicted cost(s) for a first given point along the candidate trajectory but may determine at least one different predicted cost for a second given point along the candidate trajectory. In this instance, the robotic system may or may not also determine for that second given point at least some of the same predicted cost(s) that the robotic system determined for the first given point. In practice, the concept of determining different predicted costs respectively at different points along the candidate trajectory may be used in situations where certain costs are of greater relevance or importance at certain points yet other costs are of greater relevance or importance at other points. Other instances are possible as well.

Moreover, the robotic system may use various considerations as a basis for picking out the specific costs that should be predicted at various points along a candidate trajectory. For instance, these considerations may include: the particular task that the robotic system is carrying out, the particular environment in which the robotic system is located, characteristics of the particular object that the robotic system seeks to move, characteristics of entity, and/or a type of entity in the environment, among other possibilities. Additionally or alternatively, the robotic system may receive input data specifying one or more costs that should be predicted and perhaps also specifying one or more points at which those costs should be predicted. As such, the robotic system may use that received input data as basis for picking out the specific costs.

Yet further, when determining predicted cost(s) for various candidate trajectories, the robotic system may determine the same predicted cost(s) at each candidate trajectory or may determine at least one different predicted cost for at least one candidate trajectory compared to the predicted cost(s) determined for other candidate trajectories. For instance, the robotic system could determine certain predicted cost(s) for the various selected points along the first candidate trajectory and could determine those same certain predicted cost(s) for the various selected points along the second candidate trajectory. Alternatively, the robotic system could determine certain predicted cost(s) for the various selected points along the first candidate trajectory yet could determine at least one different predicted cost for at least one point along the second candidate trajectory.

Accordingly, at any given point along any given candidate trajectory, the robotic system may determine one or more of various predicted costs. Examples of such predicted costs are described in more detail below. Although certain predicted costs are described, other predicted costs are also possible without departing from the scope of the present disclosure.

In one case, the robotic system determining a particular predicted cost for a given point along a candidate trajectory may be based on a height from which the object is predicted to be dropped if the robotic system were to drop the object at the given point. In particular, the height in this context may be defined as a measure of vertical distance between the given point and the ground (or a floor). Also, the robotic system may use various techniques to determine the predicted height, such as techniques that are currently known or those developed in the future. For instance, the robotic system may use sensor data to determine a shortest distance between the given point (e.g., a planned spatial coordinate corresponding to the given point) and the ground, and may then set that shortest distance as the predicted height at issue. In another instance, the robotic system may simply determine location of the robotic system (e.g., current or expected location of the robotic system's gripper) along the candidate trajectory and may determine the height based on that determined location. Nonetheless, the robotic system may determine the particular predicted cost based on the height in various ways.

For instance, the robotic system may have stored thereon or may otherwise have access to mapping data that maps each of a plurality of heights with a respective predicted cost. In practice, the mapping data may exhibit a relationship between the various heights and the various predicted costs, with that relationship being a linear function or an exponential function (e.g., respective predicted costs increase as heights increase), among other possibilities. For example, the mapping data may map a first height with a first predicted cost and a second height with a second predicted cost, with that first height (e.g., four meters) being higher than that second height (e.g., two meters) and with that first predicted cost (e.g., a value of eight on a scale of one to ten) being higher than the second predicted cost (e.g., a value of four on the scale of one to ten). Other examples are also possible.

In this instance, the robotic system may refer to the mapping data in order to determine a certain predicted cost. More specifically, while referring to the mapping data, the robotic system may determine that the mapping data maps the determined height with a particular predicted cost and may responsively set that particular predicted cost as the predicted cost of dropping the object at the given point along the candidate trajectory. Other instances are also possible.

Further, with regards to the mapping data concept, the robotic system may have stored thereon or may otherwise have access to various such sets of mapping data that could be used for various situations. For example, the robotic system may have stored thereon or may otherwise have access to certain mapping data for a first object and to other mapping data for a second object. In another example, the robotic system may have stored thereon or may otherwise have access to certain mapping data for a first environment and to other mapping data for a second environment. Other examples and combinations of these examples are possible as well. Moreover, any of these sets of mapping data may be customizable based on input data that the robotic system may receive (e.g., provided by a user).

In a further aspect, the robotic system could also consider aspects related to dropping the object from a height that is above a permitted height. More specifically, the robotic system may receive (and subsequently store) information specifying a maximum height from which the robotic system is permitted to drop the object. This information may be received in the form input data provided by a user and could be based on various considerations, such as by being specified in a "shipping insurance" of object for example.

Regardless of how this information is received, the robotic system may use that maximum height as a factor for determining a predicted cost of dropping the object at a given point along a candidate trajectory. In particular, the robotic system may determine a height from which the object is predicted to be dropped if the robotic system were to drop the object at the given point. Then, the robotic system may determine whether this determined height is higher than the maximum height. And if the determined height is indeed higher than the maximum height, then the robotic system may determine the predicted cost based on the determined height being higher than the maximum height. In practice, that determination could take various forms.

For example, when a determined height is higher than the maximum height, the robotic system may assign a maximum predicted cost as the predicted cost of dropping the object from that height at the given point. Generally, the maximum predicted cost may be the highest possible predicted cost that the robotic system may assign (e.g., a ten on the scale of one to ten). Also, in some situations, that maximum predicted cost could be specified in the above-mentioned received information specifying the maximum height. Consequently, upon receiving such information, the robotic system could configure mapping data to map each height higher than then maximum height respectively with the maximum predicted cost. Other examples are also possible.

Figure 6:
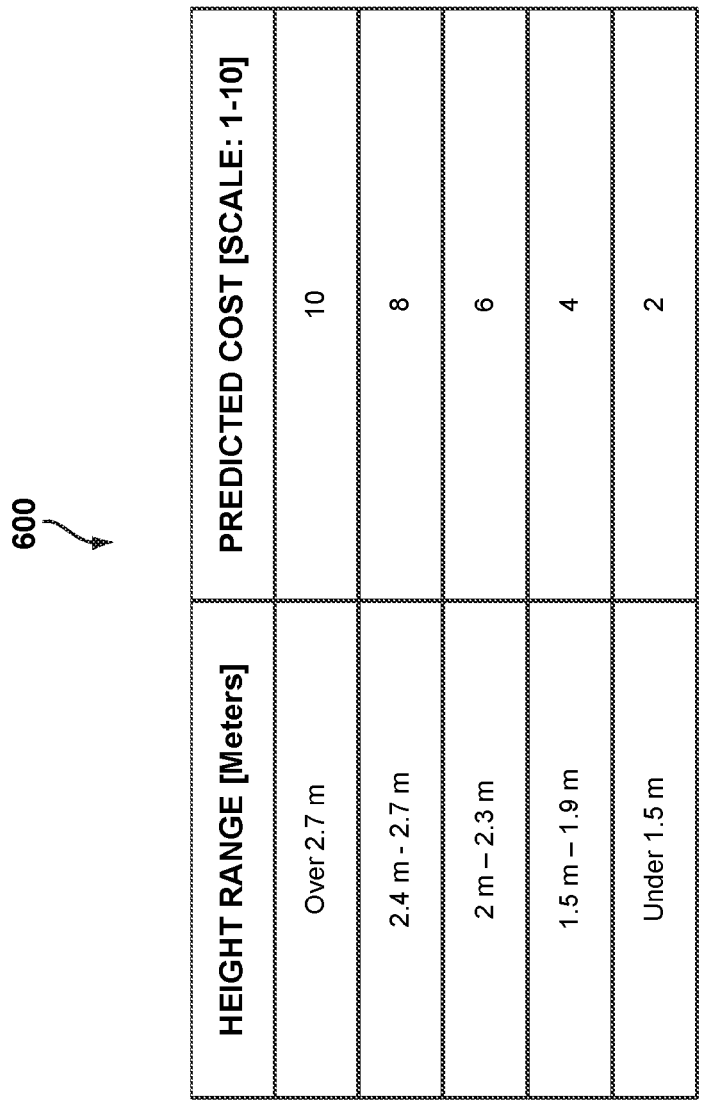
FIG. 6 illustrates a table representative of mapping data that maps certain heights with certain predicted costs, according to an example implementation.

FIG. 6 illustrates a table representative of example mapping data 600 that maps each of various heights to a respective predicted cost. As shown, heights over 2.7 meters are mapped to a predicted cost of 10 and a scale of 1 to 10, with 1 being the lowest possible predicted cost and with 10 being the highest possible predicted cost. As such, 2.7 meters could be considered to be the maximum height from which the robotic system is permitted to drop the object. Also, heights ranging between 2.4 meters and 2.7 meters are mapped to a predicted cost of 8 on the scale of 1 to 10. Additionally, heights ranging between 2 meters and 2.3 meters are mapped to a predicted cost of 6 on the scale of 1 to 10. Further, heights ranging between 1.5 meters and 1.9 meters are mapped to a predicted cost of 4 on the scale of 1 to 10. Finally, heights under 1.5 meters are mapped to a predicted cost of 2 on the scale of 1 to 10. With this arrangement, if the robotic system determines that the robotic system is predicted to drop an object from a particular height at a given point along a candidate trajectory, the robotic system could then refer to this mapping data 600 to determine a particular predicted cost to assign.

Figure 7A:
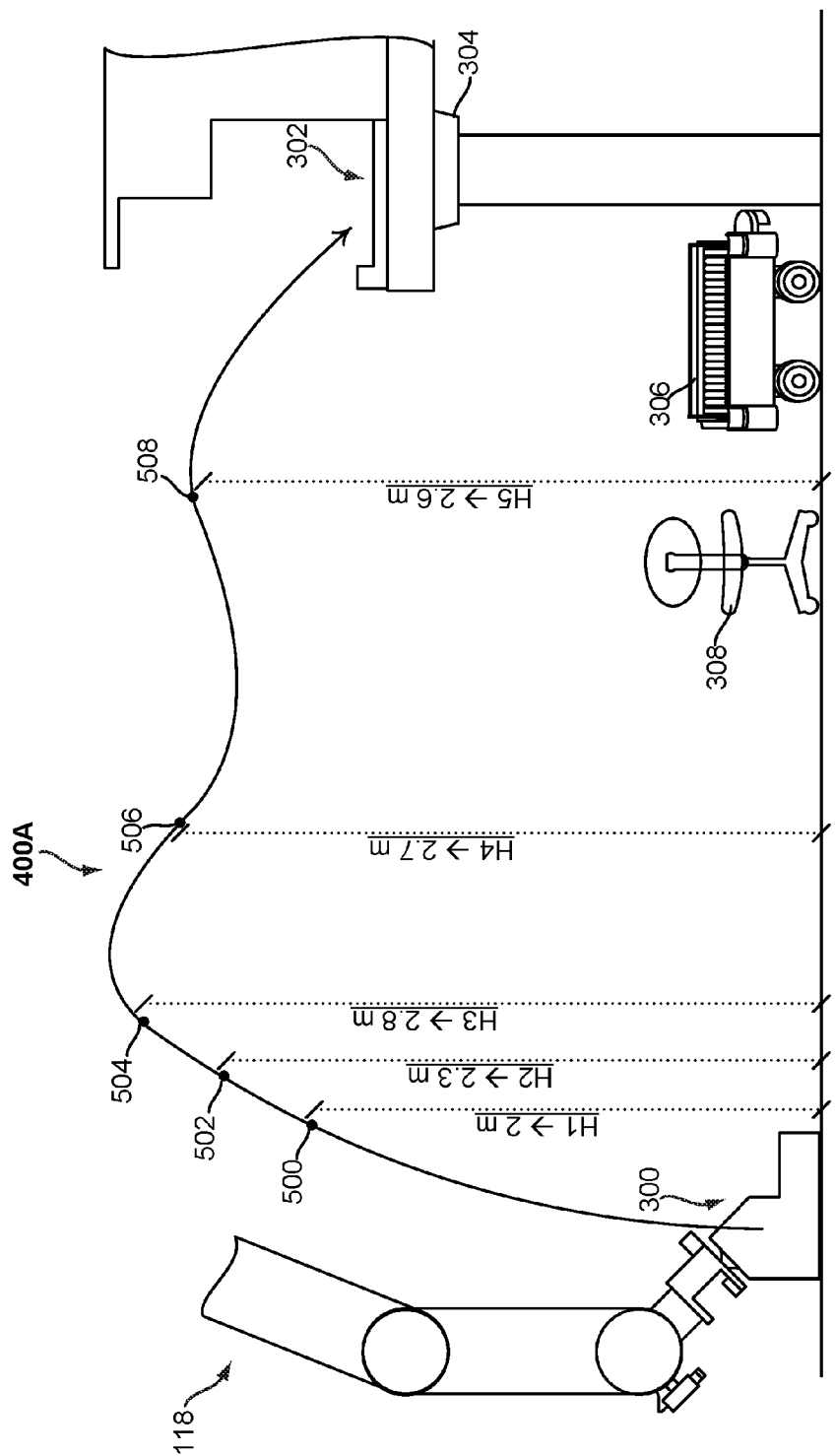
FIGS. 7A to 7B illustrate various heights associated with various selected points, according to an example implementation.
Figure 7B:
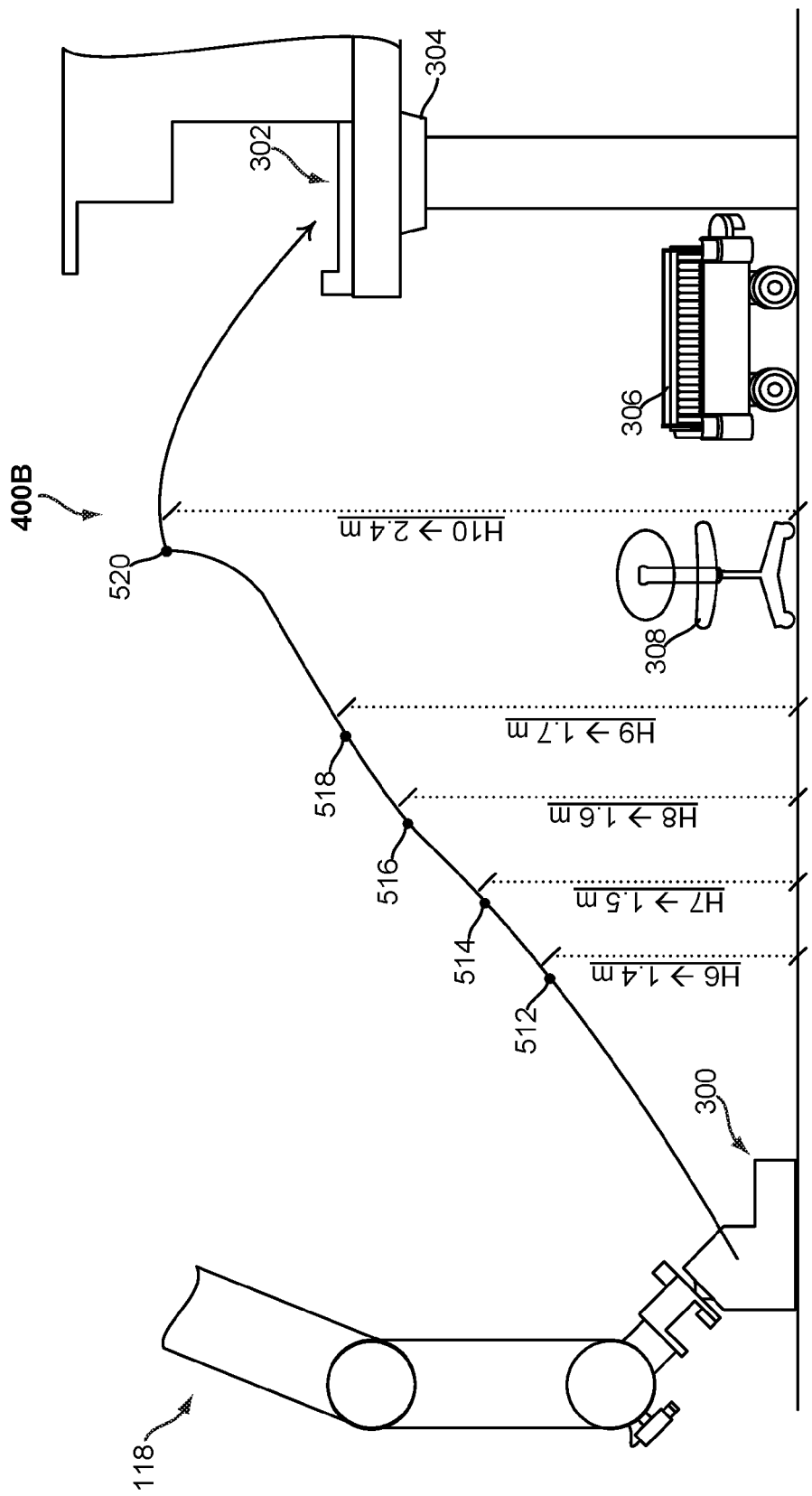

FIGS. 7A to 7B next illustrate heights corresponding to the various selected points described above in reference to FIGS. 5A to 5B. In accordance with the implementations described above, the robotic system (e.g., robot arm 118) could evaluate each given point to determine the height from which the robotic system would drop the object 300 if the robotic system were to drop the object at that given point. Subsequently, the robotic system could determine a predicted cost of dropping the object 300 at that given point and could do so based on the mapping data 600 for instance.

Regarding FIG. 7A, the robot arm 118 may determine that 2 meters is the height from which the object 300 is predicted to be dropped if the robot arm 118 were to drop the object 300 at point 500. Consequently, based on the mapping data 600, the robot arm 118 may assign a predicted cost of 6 to point 500. Also, the robot arm 118 may determine that 2.3 meters is the height from which the object 300 is predicted to be dropped if the robot arm 118 were to drop the object 300 at point 502. Consequently, based on the mapping data 600, the robot arm 118 may assign a predicted cost of 6 to point 502. Additionally, the robot arm 118 may determine that 2.8 meters is the height from which the object 300 is predicted to be dropped if the robot arm 118 were to drop the object 300 at point 504. Consequently, based on the mapping data 600, the robot arm 118 may assign a predicted cost of 10 to point 504. Further, the robot arm 118 may determine that 2.7 meters is the height from which the object 300 is predicted to be dropped if the robot arm 118 were to drop the object 300 at point 506. Consequently, based on the mapping data 600, the robot arm 118 may assign a predicted cost of 8 to point 506. Finally, the robot arm 118 may determine that 2.6 meters is the height from which the object 300 is predicted to be dropped if the robot arm 118 were to drop the object 300 at point 508. Consequently, based on the mapping data 600, the robot arm 118 may assign a predicted cost of 8 to point 500.

Regarding FIG. 7B, the robot arm 118 may determine that 1.4 meters is the height from which the object 300 is predicted to be dropped if the robot arm 118 were to drop the object 300 at point 512. Consequently, based on the mapping data 600, the robot arm 118 may assign a predicted cost of 2 to point 512. Also, the robot arm 118 may determine that 1.5 meters is the height from which the object 300 is predicted to be dropped if the robot arm 118 were to drop the object 300 at point 514. Consequently, based on the mapping data 600, the robot arm 118 may assign a predicted cost of 4 to point 514. Additionally, the robot arm 118 may determine that 1.6 meters is the height from which the object 300 is predicted to be dropped if the robot arm 118 were to drop the object 300 at point 516. Consequently, based on the mapping data 600, the robot arm 118 may assign a predicted cost of 4 to point 504. Further, the robot arm 118 may determine that 1.7 meters is the height from which the object 300 is predicted to be dropped if the robot arm 118 were to drop the object 300 at point 518. Consequently, based on the mapping data 600, the robot arm 118 may assign a predicted cost of 4 to point 518. Finally, the robot arm 118 may determine that 2.4 meters is the height from which the object 300 is predicted to be dropped if the robot arm 118 were to drop the object 300 at point 520. Consequently, based on the mapping data 600, the robot arm 118 may assign a predicted cost of 8 to point 520. Other illustrations are also possible.

In another case, the robotic system determining a particular predicted cost for a given point along a candidate trajectory may be based on a region of the environment through which the object is predicted to move if the robotic system were to drop the object at the given point (could be referred to as a "swept region"). In particular, the region at issue may be a 2D or a 3D section of physical space where the object may be physically present while moving through the physical space after being dropped at the given point. Generally, the robotic system may seek to determine such a region so as to plan to ensure safety of any entity that may in that region. In practice, such a region could be determined in various ways.

For instance, the robotic system may determine various factors related to dynamics and to characteristics of the object, and could then carry out a simulation to determine the region based on one or more such factors, with that simulation being carried out using any currently known techniques or techniques developed in the future. In practice, these factors may be any one of the following: (i) a spatial location of the object at the given point along the candidate trajectory, (ii) a spatial orientation of the object at the given point along the candidate trajectory (iii) a direction of movement of the object at the given point along the candidate trajectory, (iv) a velocity of the object at the given point along the candidate trajectory, (v) an acceleration of the object at the given point along the candidate trajectory, (vi) a shape of the object, and (vii) a size of the object. Other factors are possible as well.

Once the region is determined, the robotic system may determine a predicted cost based on that region and may do so in various ways. For instance, the robotic system may have stored thereon or may otherwise have access to mapping data that maps each of various scenarios to a respective predicted cost. In practice, these various scenarios may correspond to various combinations of the following considerations: (i) whether or not any entity is positioned within the region, (ii) a type of entity positioned within the region if at least one entity is indeed positioned within the region, and/or (iii) a count of entities positioned within the region, among other possibilities.

As an initial matter, the robotic system may make a determination of whether or not at least one entity is positioned within the determined region. To do so, for instance, the robotic system may use sensor data as basis to determine whether any entity is present anywhere in the robotic system's environment. In practice, this may involve carrying out object recognition techniques, among other possibilities. If the robotic system determines that at least one entity is present within the environment, the robotic system may then determine spatial coordinates of the at least one entity. Then, the robotic system may determine whether at least one spatial coordinate of the at least one entity matches at least one spatial coordinate of the determined region. And if at least one spatial coordinate of the at least one entity indeed matches at least one spatial coordinate of the determined region, then the robotic system may determine that the at least one entity is positioned within the determined region. Whereas, if at least one spatial coordinate of the at least one entity does not match at least one spatial coordinate of the determined region, then the robotic system may determine that no entity is positioned within the determined region. Moreover, in some arrangements, the robotic system may have a map of the environment indicating areas of the environment where entities are permitted and other areas of the environment where entities are not permitted (and thus not expected to be present). With this arrangement, the robotic system could then use the map to determine whether or not a determined region intersects with an area of the environment where entities are permitted (and perhaps expected to be present at some point in time). Other approaches are possible as well.

Accordingly, after making the determination, the robotic system may determine a predicted cost of dropping the object at the given point based on the determination of whether or not at least one entity is positioned within the determined region. In particular, if the determination is that no entity is positioned within the determined region, then the robotic system may assign a certain predicted cost to the given point at issue, which may be the lowest possible predicted cost (e.g., 1 on a scale of 1 to 10). Whereas, if the determination is that at least one entity is positioned within the determined region, then the robotic system may assign a different predicted cost to the given point, which may be higher than the predicted cost assigned in a scenario where no entity is positioned within the region. Moreover, in the scenario that at least one entity is positioned within the determined region, that different predicted cost may also be based on other considerations.

For example, the different predicted cost may be based on the type of entity positioned within the determined region. In practice, the robotic system may determine the type of entity based on object recognition techniques, among other possibilities. Also, various types of entities could be recognized, such as various different types of objects. So in an example implementation, each type of entity may have a corresponding predicted cost. For instance, if the robotic system determines that a first object (e.g., chair 308) is positioned within the determined region, then the robotic system may assign a first predicted cost (e.g., a 2 on the scale of 1 to 10) to the given point. Whereas, if the robotic system determines that a second object (e.g., window) is positioned within the determined region, then the robotic system may assign a second predicted cost (e.g., an 8 on the scale of 1 to 10) to the given point, which may be higher than the first predicted cost. In practice, a predicted cost that corresponds to a certain object may be arranged based on considerations such as: likelihood of the certain object being damaged upon impact, a predicted extent of damage to the object upon impact, and/or a value of that certain object, among other possibilities.

In another example, the above-mentioned different predicted cost may be based on the number of entities positioned within the determined region. Generally, the relationship between the numbers of entities and the predicted costs could be arranged such that, as the number of entities increases, the corresponding predicted cost also increases. For instance, if the robotic system determines that a first number (e.g., two) of entities is positioned within the determined region, then the robotic system may assign a first predicted cost (e.g., a 7 on the scale of 1 to 10) to the given point. Whereas, if the robotic system determines that a higher second number (e.g., three) of entities is positioned within the determined region, then the robotic system may assign a second predicted cost (e.g., an 8 on the scale of 1 to 10) to the given point, which may be higher than the first predicted cost. Other examples and combination of the examples are possible as well.

Moreover, rather than evaluating one point along the candidate trajectory at a time, the evaluation of swept regions may involve evaluation of all possible swept regions (or at least a subset of all possible swept regions) through which the object may move if the robotic system were to drop at any of the select points along the candidate trajectory. In particular, the robotic system may determine a plurality of regions through which the object is predicted to move if the robotic system were to drop the object along the candidate trajectory. And based on the determined plurality of regions, the robotic system may then determine a predicted cost of dropping the object along the candidate path and may do so in accordance with any of the considerations described above. For instance, these considerations may be: (i) whether or not any entity is positioned within any of the plurality of regions, (ii) types of entities positioned within the plurality of regions if at least one entity is indeed positioned within any one of the plurality of region, and/or (iii) a count of entities positioned within the plurality of regions, among other possibilities.

Figure 8A:
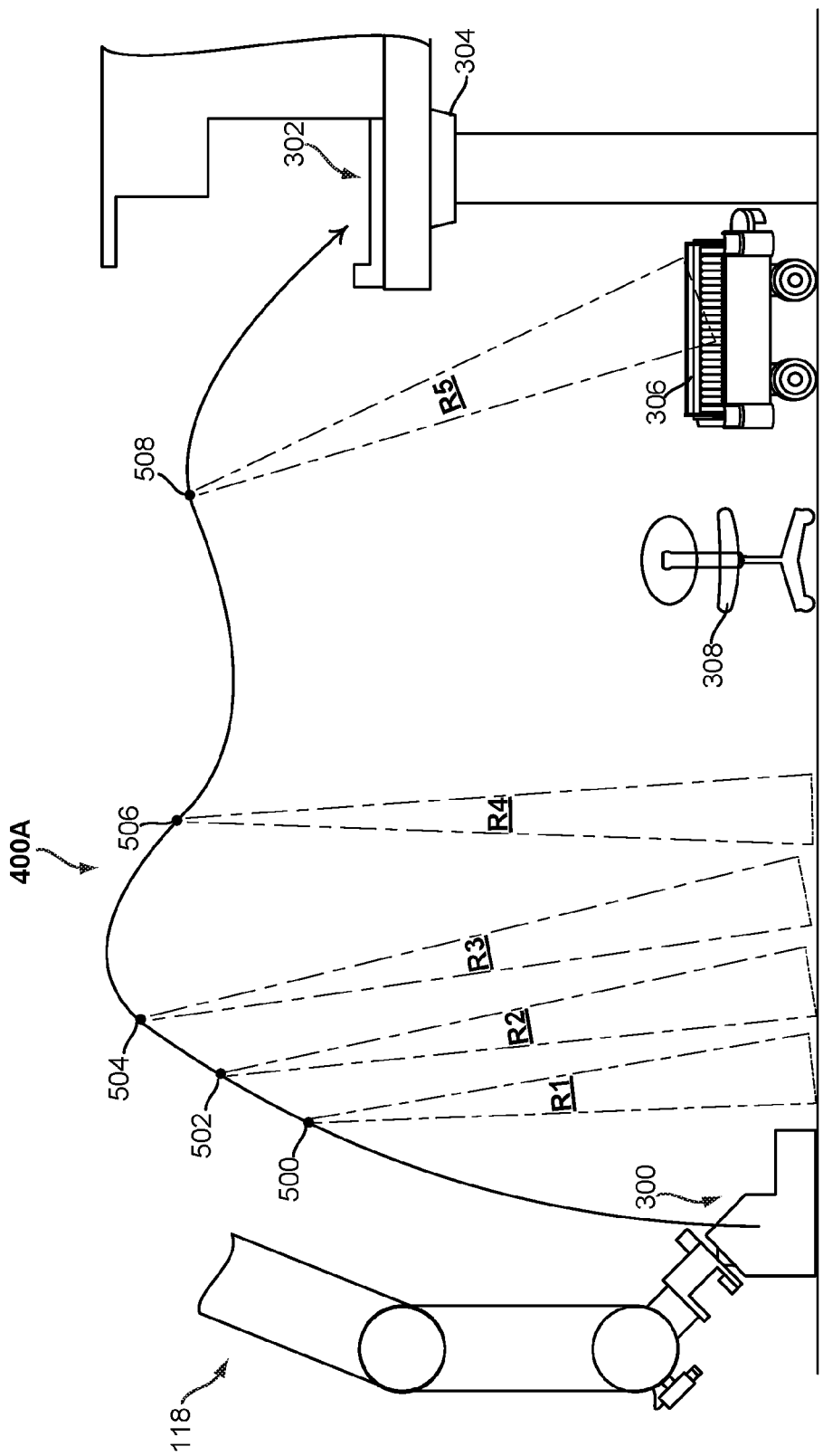
FIGS. 8A to 8B illustrate various swept regions associated with various selected points, according to an example implementation.
Figure 8B:
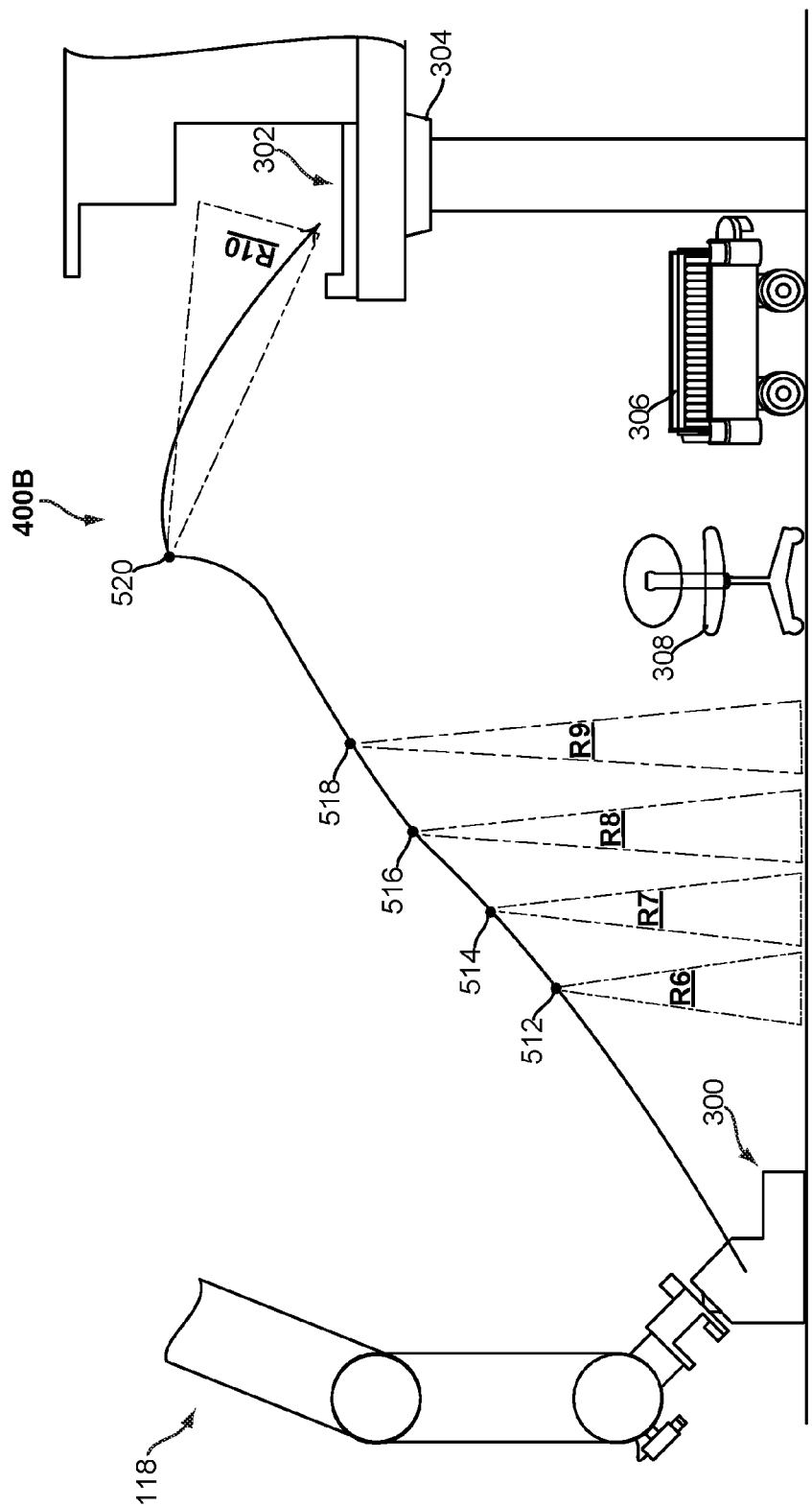

FIGS. 8A to 8B next respectively illustrate examples of such swept regions that have been determined by the robot arm 118. As shown in FIG. 8A, the object 300 would move through region R1 if the robot arm 118 were to drop the object 300 at point 500, would move through region R2 if the robot arm 118 were to drop the object 300 at point 502, would move through region R3 if the robot arm 118 were to drop the object 300 at point 504, would move through region R4 if the robot arm 118 were to drop the object 300 at point 506, and would move through region R5 if the robot arm 118 were to drop the object 300 at point 508. Also, as shown, no entity is positioned within any of regions R1, R2, R3, and R4. Consequently, the robot arm 118 may assign the lowest possible predicted cost (e.g., 1 on a scale of 1 to 10) respectively to points 500 to 506. In contrast, the robotic device 306 is shown as positioned within the region R5. Consequently, the robot arm 118 may assign the highest possible predicted cost (e.g., 10 on a scale of 1 to 10) to point 508.

Next, FIG. 8B shows that the object 300 would move through region R6 if the robot arm 118 were to drop the object 300 at point 512, would move through region R7 if the robot arm 118 were to drop the object 300 at point 514, would move through region R8 if the robot arm 118 were to drop the object 300 at point 516, would move through region R9 if the robot arm 118 were to drop the object 300 at point 518, and would move through region R10 if the robot arm 118 were to drop the object 300 at point 520. Also, as shown, no entity is positioned within any of regions R6, R7, R8, R9 and R10. Consequently, the robot arm 118 may assign the lowest possible predicted cost (e.g., 1 on a scale of 1 to 10) respectively to points 512 to 520. Note that region R10 is meant to illustrate that the robot arm 118 could throw the object 300 onto the drop-off location 302 on the platform 304. Other illustrations are also possible.

While various possible predicted costs have been in the context of height and swept region considerations, various other predicted costs that are based on other feasible considerations may also be possible. For example, the robotic system may be arranged to assign a predicted cost based on factors related to possible damage to the object being dropped once that collides with the ground or with an entity. And in another example, the robotic system may be arranged to assign a predicted cost based on further factors related to possible damage to an entity after collision with a dropped object. In either example, these various factors may be: velocity of the object at the time of collision, acceleration of the object at the time of collision, orientation of the object at the time of collision, characteristics of the dropped object (e.g., material, shape, and/or size of the dropped object), and/or characteristics of the entity (e.g., material, shape, and/or size of a different object), among others. Other examples are also possible.

Referring back to FIG. 2, at block 208, method 200 involves, based at least on the determined predicted cost for the first point along the first candidate trajectory and on the determined predicted cost for the second point along the second candidate trajectory, the robotic system selecting between the first and second candidates trajectories.

Once the robotic system determines the various predicted costs respectively for the various candidate trajectories, the robotic system may then select a candidate trajectory to use from among these various candidate trajectories and do so based at least on one or more of the determined predicted costs. To do so, the robotic system may use predicted costs respectively determined for one or more points along a candidate trajectory as basis for determining an overall predicted cost of moving the object along the candidate trajectory. As an example, the robotic system may determine a first overall predicted cost of moving the object along the first candidate trajectory and do so based on the predicted costs respectively determined for the plurality of points along the first candidate trajectory. Similarly, the robotic system may determine a second overall predicted cost of moving the object along the second candidate trajectory and do so based on the predicted costs respectively determined for the plurality of points along the second candidate trajectory. Other examples are possible as well.

In an example implementation, an overall predicted cost could be determined in various ways. For instance, the robotic system may have stored thereon or otherwise have access to at least one formula for computing an overall predicted cost, with determined predicted costs being inputs in the formula and the overall predicted cost being an output of the formula. Generally, that formula could take on one of many forms and could be customizable by a user. For example, the formula may simply involve computing an average of the various predicted costs determined for a certain candidate trajectory. In some situations, however, different predicted costs may be given different weights. For instance, each predicted cost determined based on height considerations may be given a first weight and that first weight may be applied as part of the computation. Whereas, each predicted cost determined based on swept region considerations may be given a second weight (e.g., different from the first weight) and that second weight may be applied as part of the computation. Other instances are also possible.

Once the overall predicted costs are determined, the robotic system may make a comparison between those overall predicted costs and may then select a candidate trajectory to use based on that comparison. In practice, making the comparison may simply involve determine which of the various candidate trajectories has the lowest corresponding overall predicted cost. And after making that comparison, the robotic system may then simply select the candidate trajectory having the lowest corresponding overall predicted cost. In this manner, the robotic system may essentially select the candidate trajectory providing the lowest possible consequences to dropping the object.

By way of example, the robotic system may make a comparison between (i) the first overall predicted cost of moving the object along the first candidate trajectory (ii) the second overall predicted cost of moving the object along the second candidate trajectory. In practice, that comparison may involve making a determination of whether the first overall predicted cost is lower than the second overall predicted cost or whether the second overall predicted cost is lower than the first overall predicted cost. After that determination is made, the robotic system may select the first candidate trajectory if the determination is that the first overall predicted cost is lower than the second overall predicted cost. Alternatively, the robotic system may select the second candidate trajectory if the determination is that the second overall predicted cost is lower than the first overall predicted cost. Other examples are also possible.

Referring back to FIG. 2, at block 210, method 200 involves the robotic system moving the object from the first location to the second location along the selected trajectory.

Figure 9:
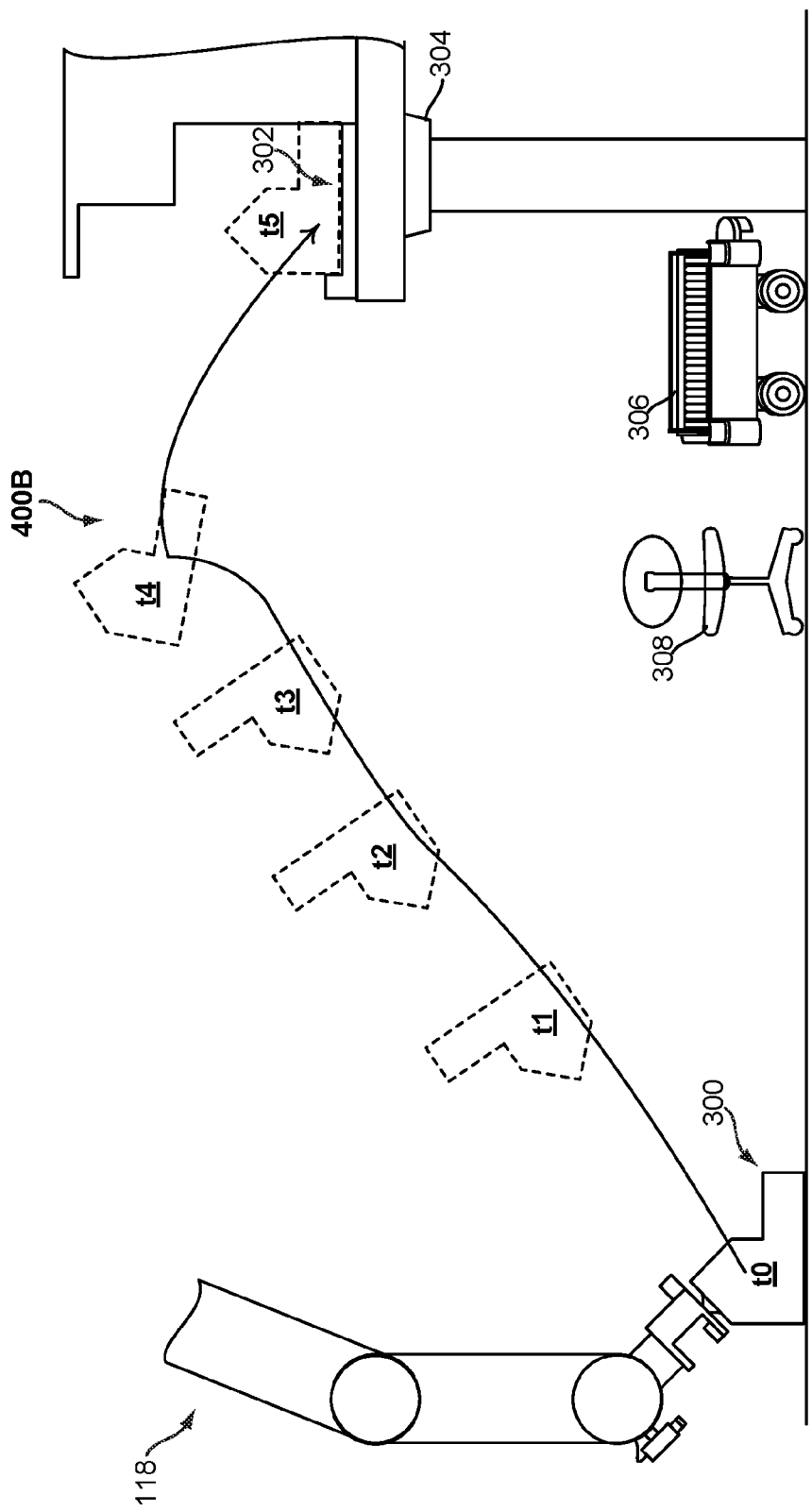
FIG. 9 illustrates the robotic arm moving the object to the drop-off location along a selected trajectory, according to an example implementation.

According to an example implementation, once the a trajectory has been selected, the robotic system may move the object from the first location to the second location in accordance with the various characteristics of the selected trajectory. In this manner, the robotic system may move the object while considering safety of the object and of entities in the environment. As an example, FIG. 9 illustrates the robotic arm 118 has selected the trajectory 400B rather than the trajectory 400A. As shown, the robotic arm 118 is moving the object 300 over time (e.g., t0-t5) to the drop-off location 302 along the selected trajectory 400B. Other illustrations are possible as well.

IV. Selection Between Trajectories Based on Probability of Dropping an Object

In a further aspect, as noted, the robotic system may also consider other factors as part of the trajectory planning process and/or as part of an evaluation of an already planned trajectory. In an example implementation, such other factors may involve consideration of at least one probability of dropping an object along a candidate trajectory. In practice, this probability consideration may be carried out in combination with the above-described predicted cost considerations or may be carried out separately from the above-described predicted cost considerations. Nonetheless, the probability consideration may take various forms.

More specifically, once one or more points have been selected along a candidate trajectory, the robotic system may determine a respective probability of dropping the object at a given point and do so each of one or more of those selected points. In particular, a probability of dropping the object may be defined as a measure representative of likelihood of dropping the object at a given point. Moreover, the probability could be presented in any feasible form, such as by a number on a certain scale of numbers, among other possibilities. For example, a probability could be quantified as a number between 0 and 1, with 0 representing impossibility of dropping the object and with 1 representing certainty of dropping the object. Generally, the higher the probability is of dropping the object, the higher the certainty is of dropping the object. Other examples are possible as well.

In an example implementation, the robotic system may use one of various techniques to determine a probability of dropping an object at a given point along a candidate path. For instance, the robotic system may determine the probability based on factors such as: (i) a velocity of the object at the given point, (ii) an acceleration of the object at the given point, and (iii) a grasp quality level representative of quality with which the robotic system grasps the object at the given point. Generally, the robotic system may determine the velocity and acceleration at issue simply based on the characteristics of the planned candidate trajectory. And with regards to the grasp quality level, the robotic system may use various currently known techniques (or techniques developed in the future) to determine the grasp quality level based on characteristics of the object (e.g., shape, size, material, and/or surface attributes), portions of the object that the robotic system plans to grasp, a type of gripper that the robotic system plans to use for grasping the object, and/or a type of grip that the robotic system plans to use for grasping the object, among other possibilities.

With these arrangements, the robotic system may determine the probability using a formula. In particular, the robotic system may have stored thereon or otherwise have access to at least one formula for computing a probability, with the velocity, acceleration, and, grasp quality level being inputs in the formula and with the probability being an output of the formula. Generally, that formula could take on many forms and could be customizable by a user.

Additionally or alternatively, the robotic system may determine the probability based on historical data. In particular, the robotic system may have stored thereon or otherwise have access to historical data specifying various situations that the robotic system (and/or other robotic system) have encountered and for each such given situation an indication of whether or not the robotic system dropped an object in that given situation. In practice, the objects in those scenarios may or may not be the same as the object that the robotic system at issue attempts to move to the drop-off location. For instance, the historical data may specify a first scenario involving first velocity, a first acceleration, and a first grasp quality level as well as an indication that the robotic system in that first scenario dropped an object. In contrast, the historical data may also specify a second scenario involving second velocity, a second acceleration, and a second grasp quality level as well as an indication that the robotic system in that second scenario did not drop an object.

As such, the robotic system can use historical data arranged in this manner to determine a probability of dropping an object at a given point along a candidate path. In particular, the robotic system may determine particular factors associated with the given point, which may involve a particular velocity, a particular acceleration, and a particular grasp quality level as discussed above. Once those particular factors have been determined, the robotic system may refer to the historical data to determine a number (e.g., 10) of other scenarios that also involve those particular factors and may determine a count (e.g., 6) of how many of those scenarios resulted in dropping of an object. Then, the robotic system may determine the probability (e.g., 0.6) based on that count and on the total number of such scenarios found within the historical data. Other approaches are possible a well.

Once the robotic system determines the various probabilities respectively for the various candidate trajectories, the robotic system may then select a candidate trajectory to use from among these various candidate trajectories and do so based on predicted costs considerations as described above and also based at least on one or more of the determined probabilities. To do so, the robotic system may use predicted costs and probabilities respectively determined for a plurality of points along a candidate trajectory as basis for determining a score associated with moving the object along that candidate trajectory. In practice, the robotic system may determine that score in various ways.

For instance, for each given point of the plurality of point along the candidate trajectory, the robotic system may weight the determined predicted cost at that given point by the determined probability at that given point, so as to result in a weighted predicted cost associated with that given point. As an example, if a determined predicted cost at a given point is 8 and a determined probability at the given point is 0.5, then the weighted predicted cost associated with that given point would be 4. Nonetheless, once various such weighted predicted costs are determined respectively for the plurality of points along the candidate trajectory, the robotic system may then use those weighted predicted costs to determine an overall predicted cost as described above, which could also be referred to as a weighted overall predicted cost. In this implementation, the robotic system may then set that weighted overall predicted cost as the score associated with the candidate trajectory. Other examples are possible as well.

Given this implementation, the robotic system may determine such a score for each of the various candidate trajectories and could use these scores as basis for selecting a trajectory. For instance, the robotic system may determine a first score associated with moving the object along the first candidate trajectory and may determine a second score associated with moving the object along the second candidate trajectory. Then, the robotic system may make a comparison between the first and second scores and may use that comparison as basis for selecting between the first and second candidate trajectories. As an example, the robotic system may determine that the first score (e.g., a first weighted overall predicted cost) is lower than the second score (e.g., a second weighted overall predicted cost) and may responsively select the first candidate trajectory. Other examples are possible as well.

V. Evaluation of a Single Candidate Trajectory at a Time

Figure 10:
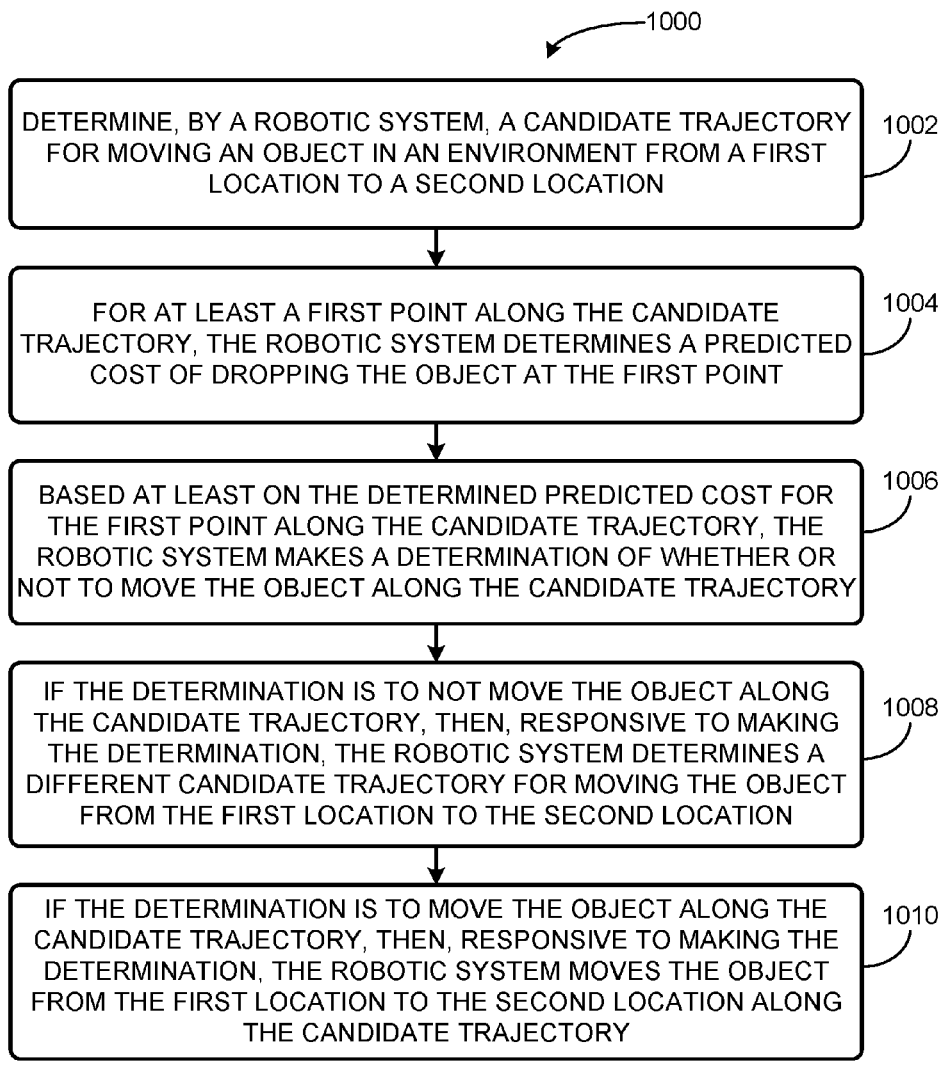
FIG. 10 is a flowchart for determining whether or not to use a candidate trajectory, according to an example implementation.

While various implementations have been described above in the context of making a selection between candidate trajectories, any of the above-described features may also apply in the context of evaluating a single candidate trajectory at a time. In this regard, FIG. 10 is a flowchart illustrating a method 1000 that may be implemented to evaluate a single candidate trajectory for movement of an object by a robotic system.

At block 1002, method 1000 involves determining, by a robotic system, a candidate trajectory for moving an object in an environment from a first location to a second location. In practice, this candidate trajectory could be determined using any techniques as described above in association with method 200.

At block 1004, method 1000 involves, for at least a first point along the candidate trajectory, the robotic system determining a predicted cost of dropping the object at the first point. In practice, a predicted cost could be determined using any techniques as described above in association with method 200. Moreover, in some cases, the robotic system may also, for at least the first point along the candidate trajectory, determine a probability of the robotic system dropping the object at the first point. Furthermore, such predicted cost and/or probability determinations may also apply in the context of a plurality of points along the candidate trajectory.

At block 1006, method 1000 involves, based at least on the determined predicted cost for the first along the candidate trajectory, the robotic system making a determination of whether or not to move the object along the candidate trajectory. In some cases, such a determination could also be based on determined probability for the first along the candidate trajectory. Furthermore, such determinations based predicted cost and/or probability may also apply in the context of a plurality of points along the candidate trajectory.

Also, at block 1008, method 1000 involves, if the determination is to not move the object along the candidate trajectory, then, responsive to making the determination, the robotic system determining a different candidate trajectory for moving the object from the first location to the second location. Whereas, at block 1008, method 1000 involves, if the determination is to move the object along the candidate trajectory, then, responsive to making the determination, the robotic system moving the object from the first location to the second location along the candidate trajectory.

In an example implementation, making the determination of whether or not to move the object along the candidate trajectory could take various forms. For instance, if the robotic system only applies predicted cost considerations, then then robotic system may use techniques described above to determine an overall predicted cost of moving the object along the candidate trajectory. Then, the robotic system may determine whether or not that determined overall predicted cost is lower than a threshold overall predicted cost. So if the robotic system determines that the determined overall predicted cost is indeed lower than the threshold overall predicted cost, then the robotic system may move the object along the candidate path. Whereas, if the robotic system determines that the determined overall predicted cost is higher than the threshold overall predicted cost, then the robotic system may then determine a different candidate trajectory (e.g., again engage in a trajectory planning process) and may evaluate that different candidate trajectory as described herein and so on.

Generally, an overall predicted cost being threshold low could be representative of relatively lower consequences of dropping the object along the candidate trajectory. In contrast, an overall predicted cost being threshold high could be representative of relatively higher consequences of dropping the object along the candidate trajectory.

In another instance, if the robotic system applies both predicted cost and probability considerations, then the robotic system may use techniques described above to determine a score associated with moving the object along the candidate trajectory. Then, the robotic system may determine whether or not that determined score is lower than a threshold score. So if the robotic system determines that the determined score is indeed lower than the threshold score, then the robotic system may move the object along the candidate trajectory. Whereas, if the robotic system determines that the determined score is higher than the threshold score, then the robotic system may then determine a different candidate trajectory and may evaluate that different candidate trajectory as described herein and so on. Other instances are possible as well.

Furthermore, when the robotic system determines or otherwise evaluates a different candidate trajectory, the robotic system could determine that the different candidate trajectory is invalid. For instance, the robotic system may carry out the evaluations described herein (e.g., predicted cost and probability considerations) and/or various other evaluations, and may determine that the different candidate trajectory should not be used to move the object at issue. As such, in some situations, the robotic system may determine that no candidate trajectory is valid for moving the object. In such situations, the robotic system may then provide an indication indicating that a valid candidate trajectory is unavailable for the robotic system to use for movement of the object to the desired location. In practice, that indication could take on various forms.

For example, the indication could take the form of a visual indication, such as emission by the robotic system (e.g., using an LED) of light having certain color and/or intensity for instance. In another example, the indication could take the form of an audible indication, such as a emission by the robotic system (e.g., using a speaker) of a particular sound and/or of a particular phrase. In yet another example, providing the indication could take the form of the robotic system transmitting a notification to a computing device (e.g., a user's device), with that notification including the indication (e.g., a text message specifying that a valid trajectory was not found). In yet another example, the robotic system may simply display the indication via a display device of the robotic system. Other examples are also possible.

VI. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

I claim:

1. A method comprising:
    determining, by a control system, a candidate trajectory for a robotic system to move an object in an environment from a first location to a second location;
    for at least a first point along the candidate trajectory, the control system determining a predicted cost of dropping the object at the first point;
    based at least on the determined predicted cost for the first point along the candidate trajectory, the control system making a determination of whether or not to move the object along the candidate trajectory;
    if the determination is to not move the object along the candidate trajectory, then, responsive to making the determination, the control system determining a different candidate trajectory for the robotic system to move the object from the first location to the second location; and
    if the determination is to move the object along the candidate trajectory, then, responsive to making the determination, the control system causing the robotic system to move the object from the first location to the second location along the candidate trajectory.

2. The method of claim 1, wherein the first point is an inflection point defining a point of transition between a convex segment of the candidate trajectory and a concave segment of the candidate trajectory.

3. The method of claim 1, wherein determining the predicted cost of dropping the object at the first point comprises:
    determining a height from which the object is predicted to be dropped if the robotic system were to drop the object at the first point along the candidate trajectory; and based at least on the determined height, determining the predicted cost of dropping the object at the first point along the candidate trajectory.

4. The method of claim 3, wherein determining the predicted cost of dropping the object at the first point based at least on the determined height comprises:
referring to a data storage containing mapping data that maps (i) each of a plurality of heights with (ii) a respective predicted cost;
while referring to the data storage, determining that the mapping data maps the determined height with a particular predicted cost; and
in response to determining that the mapping data maps the determined height with the particular predicted cost, setting the particular predicted cost as the predicted cost of dropping the object at the first point along the candidate trajectory.

5. The method of claim 1, further comprising:
receiving, by the control system, information specifying a maximum height from which the robotic system is permitted to drop the object;
determining a height from which the object is predicted to be dropped if the robotic system were to drop the object at the first point along the candidate trajectory; and
determining that the determined height is higher than the maximum height, wherein determining the predicted cost of dropping the object at the first point is based at least on the determined height being higher than the maximum height.

6. The method of claim 5, wherein determining the predicted cost of dropping the object at the first point based at least on the determined height being higher than the maximum height comprises:
based at least on the determined height being higher than the maximum height, assigning a maximum predicted cost as the predicted cost of dropping the object at the first point.

7. The method of claim 1, wherein determining the predicted cost of dropping the object at the first point comprises:
determining a region of the environment through which the object is predicted to move if the robotic system were to drop the object at the first point; and
based at least on the determined region, determining the predicted cost of dropping the object at the first point.

8. The method of claim 7, wherein determining the region comprises:
determining one or more of the following factors: (i) a spatial location of the object at the first point, (ii) a spatial orientation of the object (iii) a direction of movement of the object at the first point, (iv) a velocity of the object at the first point, (v) an acceleration of the object at the first point, (vi) a shape of the object, and (vii) a size of the object; and
determining the region based at least on one or more of the determined factors.

9. The method of claim 7, wherein determining the predicted cost of dropping the object at the first point based at least on the determined region comprises:
making a determination of whether or not at least one entity is positioned within the determined region; and
determining the predicted cost of dropping the object at the first point based at least on the determination of whether or not at least one entity is positioned within the determined region.

10. The method of claim 7, wherein determining the predicted cost of dropping the object at the first point based at least on the determined region comprises:
determining that at least one entity is positioned within the determined region;
in response to determining that at least one entity is positioned within the determined region; determining an entity type of the at least one entity; and
based at least on the determined entity type of the at least one entity, determining the predicted cost of dropping the object at the first point.

11. The method of claim 1, further comprising:
for at least the first point along the candidate trajectory, the control system determining a probability of the robotic system dropping the object at the first point,
wherein making the determination is further based on the determined probability for the first point along the candidate trajectory.

12. The method of claim 11, wherein determining the probability of the robotic system dropping the object at the first point comprises:
determining one or more of (i) a velocity of the object at the first point, (ii) an acceleration of the object at the first point, and (iii) a grasp quality level representative of quality with which the robotic system grasps the object at the first point; and
based on one or more of (i) the determined velocity, (ii) the determined acceleration, and (iii) the determined grasp quality level, determining the probability of the robotic system dropping the object at the first point.

13. The method of claim 1, further comprising:
determining, by the control system, a predicted cost of dropping the object at a second point along the candidate trajectory;
wherein making the determination is further based on the determined predicted cost for the second point along the candidate trajectory.

14. The method of claim 13, further comprising:
determining, by the control system, at least (i) a probability of the robotic system dropping the object at the first point along the candidate trajectory and (ii) a probability of the robotic system dropping the object at the second point along the candidate trajectory,
wherein making the determination is further based on the determined probabilities for the first and second points along the candidate trajectory.

15. The method of claim 1, wherein determining a different candidate trajectory for moving the object from the first location to the second location comprises:
determining that the different candidate trajectory is invalid; and
in response to determining that the different candidate trajectory is invalid, providing an indication indicating that a valid candidate trajectory is unavailable.

16. A robotic system comprising:
one or more processors;
a non-transitory computer readable medium; and
program instructions stored on the non-transitory computer readable medium and executable by the one or more processors to:
determine a candidate trajectory for moving an object in an environment from a first location to a second location;
for at least a first point along the candidate trajectory, determine a predicted cost of dropping the object at the first point;

based at least on the determined predicted cost for the first point along the candidate trajectory, make a determination of whether or not to move the object along the candidate trajectory;

if the determination is to not move the object along the candidate trajectory, then, responsive to making the determination, determine a different candidate trajectory for moving the object from the first location to the second location; and if the determination is to move the object along the candidate trajectory, then, responsive to making the determination, move the object from the first location to the second location along the candidate trajectory.

17. The robotic system of claim 16, wherein determining the predicted cost of dropping the object at the first point comprises:

determining a height from which the object is predicted to be dropped if the robotic system were to drop the object at the first point along the candidate trajectory; and based at least on the determined height, determining the predicted cost of dropping the object at the first point along the candidate trajectory.

18. The robotic system of claim 16, wherein the program instructions are further executable to:

receive information specifying a maximum height from which the robotic system is permitted to drop the object;

determine a height from which the object is predicted to be dropped if the robotic system were to drop the object at the first point along the candidate trajectory; and determine that the determined height is higher than the maximum height, wherein determining the predicted cost of dropping the object at the first point is based at least on the determined height being higher than the maximum height.

19. The robotic system of claim 16, wherein determining the predicted cost of dropping the object at the first point comprises:

determining a region of the environment through which the object is predicted to move if the robotic system were to drop the object at the first point; and based at least on the determined region, determining the predicted cost of dropping the object at the first point.

20. A non-transitory computer readable medium having stored therein instructions executable by one or more processors to cause a control system to perform functions comprising:

determining a candidate trajectory for a robotic system to move an object in an environment from a first location to a second location;

for at least a first point along the candidate trajectory, determining a predicted cost of dropping the object at the first point;

based at least on the determined predicted cost for the first point along the candidate trajectory, making a determination of whether or not to move the object along the candidate trajectory;

if the determination is to not move the object along the candidate trajectory, then, responsive to making the determination, determining a different candidate trajectory for the robotic system to move the object from the first location to the second location; and if the determination is to move the object along the candidate trajectory, then, responsive to making the determination, causing the robotic system to move the object from the first location to the second location along the candidate trajectory.

\* \* \* \* \*